US009471053B2

(12) United States Patent
Sone

(10) Patent No.: US 9,471,053 B2
(45) Date of Patent: Oct. 18, 2016

(54) NOTIFICATION METHOD, NOTIFICATION DEVICE, NOTIFICATION SYSTEM, STORAGE MEDIUM, INFORMATION EXCHANGE NETWORKING SERVICE PROVIDING SERVER, AND MOBILE TERMINAL

(71) Applicant: SHARP KABUSHIKI KAISHA, Osaka-shi, Osaka (JP)

(72) Inventor: Motoki Sone, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 89 days.

(21) Appl. No.: 14/467,585

(22) Filed: Aug. 25, 2014

(65) Prior Publication Data

US 2015/0061879 A1 Mar. 5, 2015

(30) Foreign Application Priority Data

Aug. 27, 2013 (JP) .................... 2013-176064

(51) Int. Cl.
| | | |
|---|---|---|
| G08B 21/00 | (2006.01) | |
| G05B 15/02 | (2006.01) | |
| D06F 33/02 | (2006.01) | |
| F24F 11/00 | (2006.01) | |

(52) U.S. Cl.
CPC ............... G05B 15/02 (2013.01); *D06F 33/02* (2013.01); *D06F 2202/12* (2013.01); *D06F 2204/10* (2013.01); *D06F 2210/00* (2013.01); *D06F 2216/00* (2013.01); *F24F 2011/0091* (2013.01); *G05B 2219/2614* (2013.01); *G05B 2219/2642* (2013.01); *G05B 2219/37095* (2013.01)

(58) Field of Classification Search
CPC ..... G08B 21/185; G08B 15/02; G08B 21/18
USPC ............... 340/635, 540, 541, 567, 5.2, 10.5
See application file for complete search history.

(56) References Cited

U.S. PATENT DOCUMENTS

| | | | |
|---|---|---|---|
| 6,512,926 B1 | 1/2003 | Henry-Labordere | |
| 7,424,733 B2* | 9/2008 | Kamiwada | .......... H04L 12/2803 340/5.2 |
| 7,822,188 B1 | 10/2010 | Kirchhoff et al. | |
| 7,861,090 B2* | 12/2010 | Kimura | .................... G06F 21/31 370/260 |
| 8,325,901 B1 | 12/2012 | Dolan et al. | |
| 8,350,694 B1* | 1/2013 | Trundle | ................. G08B 25/08 340/539.11 |
| 2002/0013757 A1 | 1/2002 | Bykowsky et al. | |
| 2003/0215078 A1 | 11/2003 | Brahm et al. | |
| 2006/0227957 A1 | 10/2006 | Dolan et al. | |
| 2007/0103712 A1* | 5/2007 | Corona | ................. G06F 21/335 358/1.14 |

FOREIGN PATENT DOCUMENTS

| | | |
|---|---|---|
| CN | 201251660 Y | 6/2009 |
| JP | 2001-016632 A | 1/2001 |
| JP | 2003-516591 A | 5/2003 |

(Continued)

*Primary Examiner* — Tai Nguyen
(74) *Attorney, Agent, or Firm* — Birch, Stewart, Kolasch & Birch, LLP

(57) ABSTRACT

A notification method includes the steps of: (a) receiving an operation signal for operating an electrical appliance; (b) determining whether or not to deny an operation indicated by the operation signal; and (c) when the step (b) determines to deny the operation, causing an electronic message board to display thereon an object indicating that the operation is denied.

20 Claims, 16 Drawing Sheets

(56) References Cited

FOREIGN PATENT DOCUMENTS

| JP | 2003-316669 A | 11/2003 |
| JP | 2004-56466 A | 2/2004 |
| JP | 2005-526466 A | 9/2005 |
| JP | 2008-048225 A | 2/2008 |

* cited by examiner

NOTIFICATION METHOD, NOTIFICATION DEVICE, NOTIFICATION SYSTEM, STORAGE MEDIUM, INFORMATION EXCHANGE NETWORKING SERVICE PROVIDING SERVER, AND MOBILE TERMINAL

This nonprovisional application claims priority under 35 U.S.C. §119 on Patent Application No. 2013-176064 filed in Japan on Aug. 27, 2013, the entire contents of which is hereby incorporated by reference.

TECHNICAL FIELD

The present invention relates to a notification method, a notification device, a notification system, a storage medium, an electronic message board server, and a mobile terminal, all of which implement providing notification of an operating status of an electrical appliance.

BACKGROUND ART

There has been known a technique in which electrical appliances such as an air conditioner and a washing machine are connected to a network provided in a house so that the electrical appliances are operated in accordance with an operation signal transmitted from a mobile terminal.

For example, Patent Literature 1 describes a technique for performing remote control of an electrical appliance by means of a personal computer or a mobile phone (mobile terminal). Patent Literature 1 describes, for example, an electrical appliance network system (control system) in which, in a case where a user instructs an air conditioner through his/her mobile phone to become in an on-state, the mobile phone displays thereon information indicating that the air conditioner has come into operation. From the information, displayed on the mobile phone, indicating the initiation of operation of the air conditioner, the user can make sure that the air conditioner has really become in an on-state.

CITATION LIST

Patent Literature

[Patent Literature 1]
Japanese Patent Application Publication, Tokukai No. 2008-48225 (Publication date: Feb. 28, 2008)

SUMMARY OF INVENTION

Technical Problem

There has also been known an arrangement in which one and the same electrical appliance can accept, via, for example, a network, operations instructed from a plurality of users.

Such an arrangement can give rise to a situation where any of a plurality of operations instructed from different users who use individual mobile terminals is denied. This applies to, for example, a case where operations instructed from different users almost at the same time are conflicting operations.

In this situation, even if the technique described in Patent Literature 1 is applied to the situation, the fact that an operation instructed from one user has been denied cannot be realized by other user.

The present invention has been attained to solve the above problem. An object of the present invention is to implement a notification method, a notification device, a notification system, a storage medium, an electronic message board server, and a mobile terminal, all of which enable, when the operation instructed with respect to an electrical appliance is denied, notifying to a plurality of users that the operation is denied.

Solution to Problem

In order to solve the above problem, a notification method in accordance with an embodiment of the present invention is a notification method for providing notification of an operating status of an electrical appliance, including the steps of: (a) receiving an operation signal for operating the electrical appliance; (b) determining whether or not to deny an operation indicated by the operation signal received in the step (a); and (c) when the step (b) determines to deny the operation, causing an electronic message board to display thereon an object indicating that the operation is denied.

In order to solve the above problem, a notification device in accordance with an embodiment of the present invention is a notification device for providing notification of an operating status of an electrical appliance, including: a receiving section for receiving an operation signal for operating the electrical appliance; determining means for determining whether or not to deny an operation indicated by the operation signal received by the receiving section; and display control means for, when the determining means determines to deny the operation, causing an electronic message board to display thereon an object indicating that the operation is denied.

In order to solve the above problem, a notification system in accordance with an embodiment of the present invention is a notification system including: a notification device for providing notification of an operating status of an electrical appliance; and the electrical appliance, the notification device including: a receiving section for receiving an operation signal for operating the electrical appliance; determining means for determining whether or not to deny an operation indicated by the operation signal received by the receiving section; display control means for, when the determining means determines to deny the operation, causing an electronic message board to display thereon an object indicating that the operation is denied; and control signal generating means for, when the determining means determines not to deny the operation, generating a control signal for controlling the electrical appliance to execute the operation, the electrical appliance including: a control signal receiving section for receiving the control signal generated by the control signal generating means; and operation executing means for executing the operation based on the control signal.

In order to solve the above problem, an electronic message board server in accordance with an embodiment of the present invention is an electronic message board server for providing notification of an operating status of an electrical appliance in cooperation with a notification device for providing notification of the operating status of the electrical appliance, the electronic message board server comprising: a message board control signal receiving section for receiving a message board control signal from the notification device; and message board managing means for causing an electronic message board to display thereon an object corresponding to the message board control signal, when the message board control signal receiving section receives the message board control signal which indicates an instruction to display an object indicating that the notification device has denied an operation indicated by an operation signal, received by the notification device, for operating the electrical appliance, the message board managing means causing the electronic message board to display thereon the object indicating that the operation has been denied.

In order to solve the above problem, a mobile terminal in accordance with an embodiment of the present invention is a mobile terminal for providing notification of an operating status of an electrical appliance in cooperation with an electronic message board server and a notification device for providing notification of the operating status of the electrical appliance, the mobile terminal including: a display section for displaying thereon an electronic message board provided by the electronic message board server, when the notification device denies an operation indicated by an operation signal, received by the notification device, for operating the electrical appliance, the display section displaying thereon the electronic message board on which an object indicating that the operation is denied is displayed thereon.

Each of the notification devices in accordance with the aspects of the present invention may be realized by a computer. In this case, the present invention also encompasses a non-transitory computer-readable storage medium storing a program for allowing a computer to serve as the notification device by causing the computer to operate as the foregoing means provided in the notification device.

Advantageous Effects of Invention

According the present invention, in an event that an instruction to execute an operation unfavorable for an electrical appliance is provided, it is possible to avoid the electrical appliance from executing such an operation, and it is also possible to notify, to a plurality of users, that that operation has not been executed.

Figure 15:
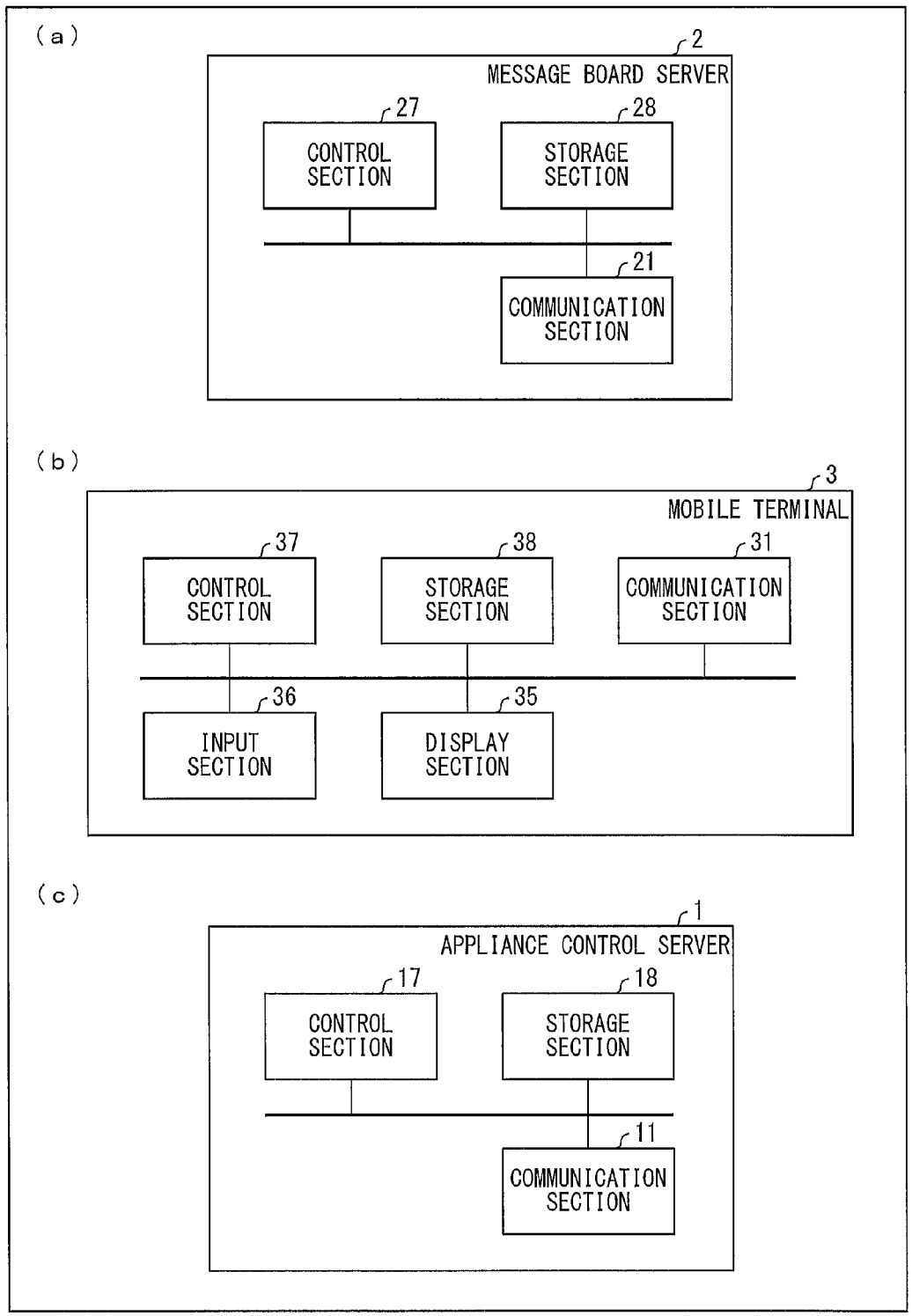
FIG. 15

(a) of FIG. 15 is a block diagram illustrating a hardware configuration of a message board server in accordance with an embodiment of the present invention. (b) of FIG. 15 is a block diagram illustrating a hardware configuration of a mobile terminal in accordance with an embodiment of the present invention. (c) of FIG. 15 is a block diagram illustrating a hardware configuration of an appliance control server in accordance with an embodiment of the present invention.

Figure 16:
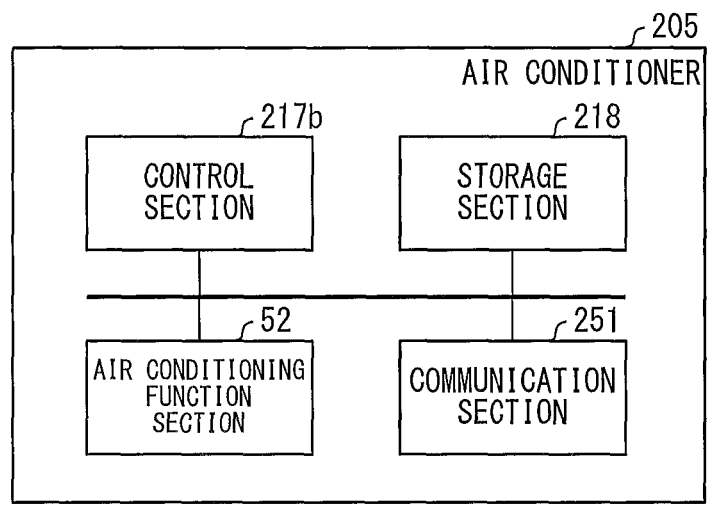

FIG. 16 is a block diagram illustrating a hardware configuration of an air conditioner in accordance with an embodiment of the present invention.

Figure 17:
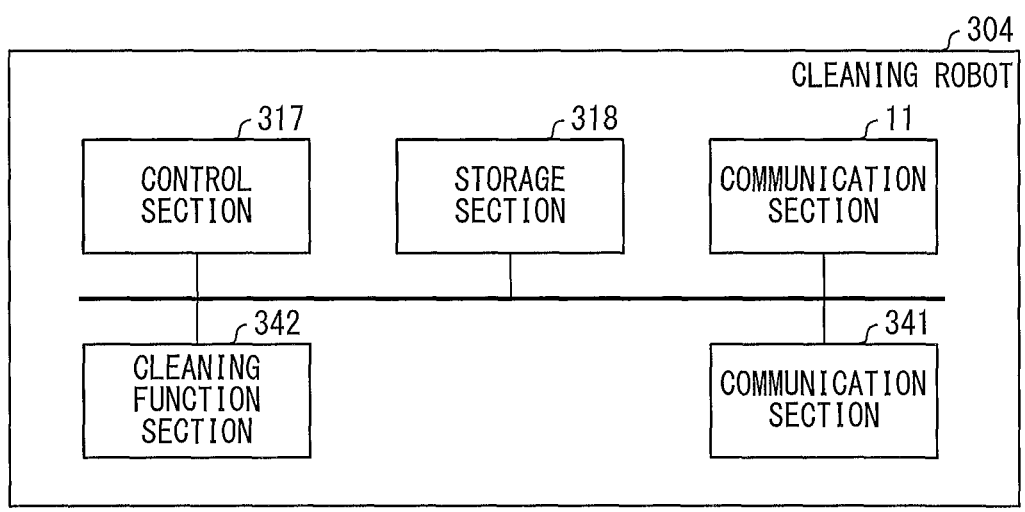

FIG. 17 is a block diagram illustrating a hardware configuration of a cleaning robot in accordance with an embodiment of the present invention.

DESCRIPTION OF EMBODIMENTS

Embodiment 1

An appliance control system 100 (notification system) in accordance with the present embodiment will be described below with reference to FIGS. 1 to 5 and FIG. 15. It should be noted the arrangements described in Embodiment 1 serve solely as examples and are not intended to limit the scope of the present invention, unless otherwise specified.

Figure 1:
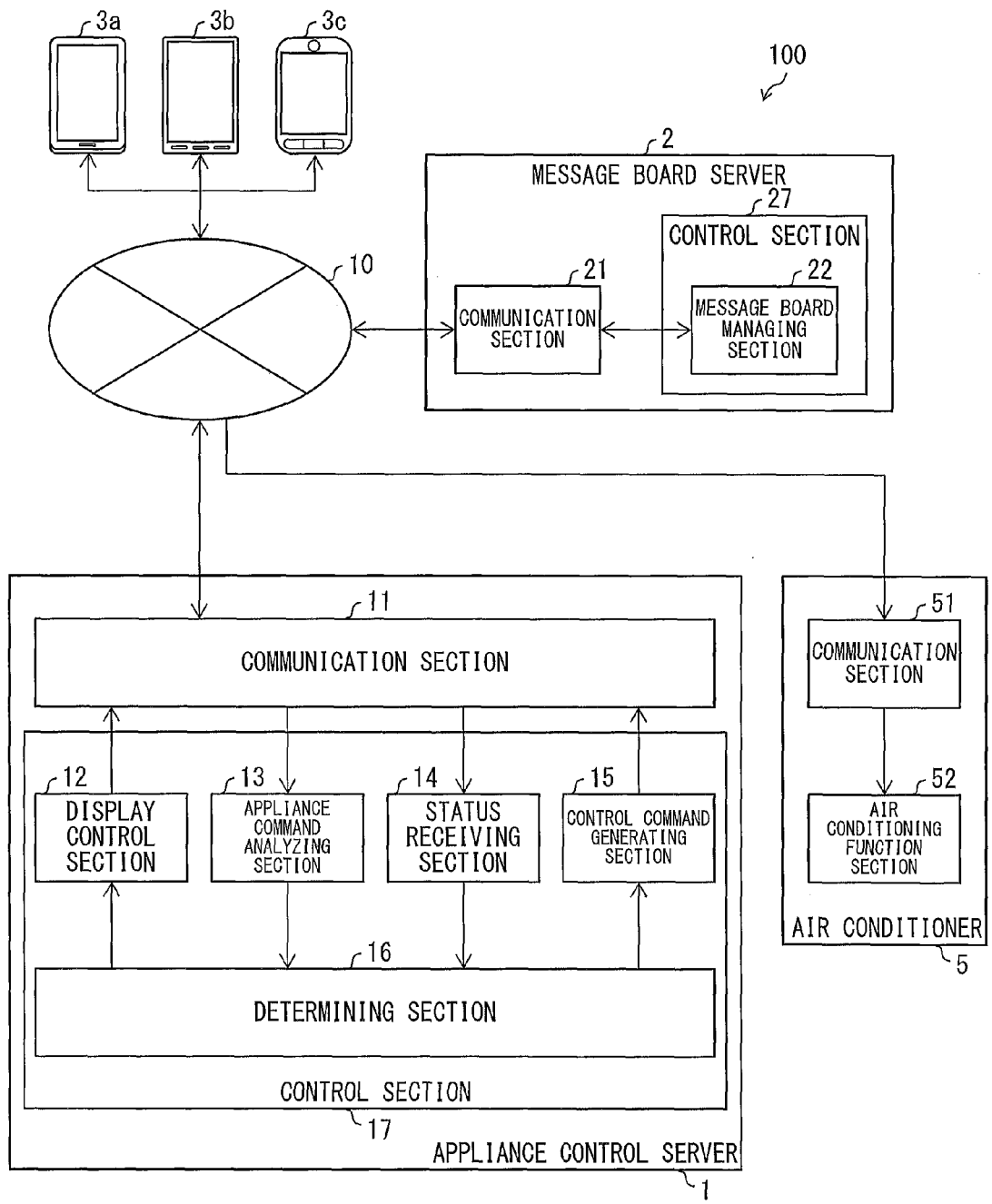
FIG. 1 is a block diagram illustrating a configuration of main parts of an appliance control server in accordance with an embodiment of the present invention.
Figure 2:
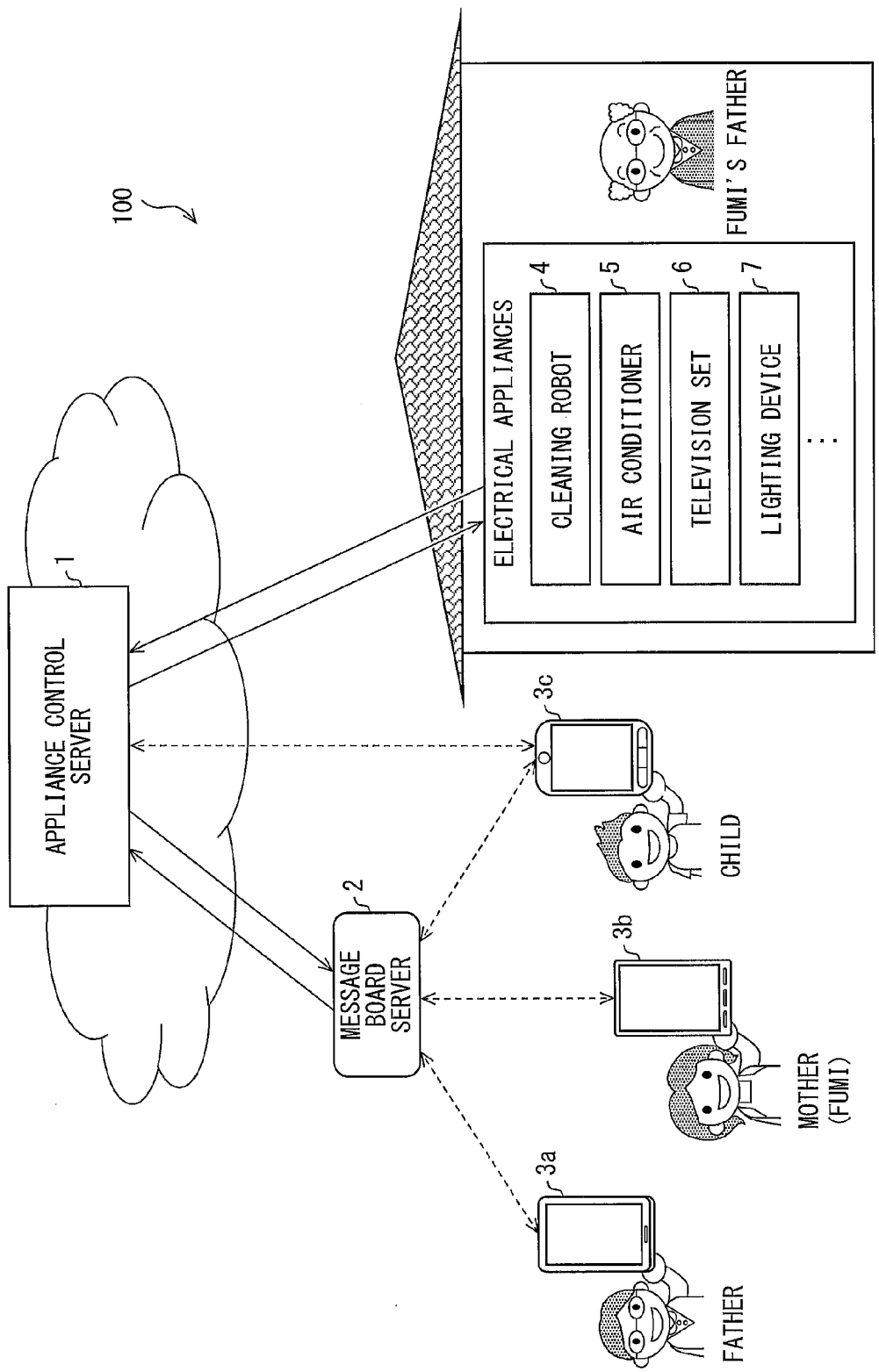
FIG. 2 is a diagram schematically illustrating an appliance control system in accordance with an embodiment of the present invention.
Figure 3:
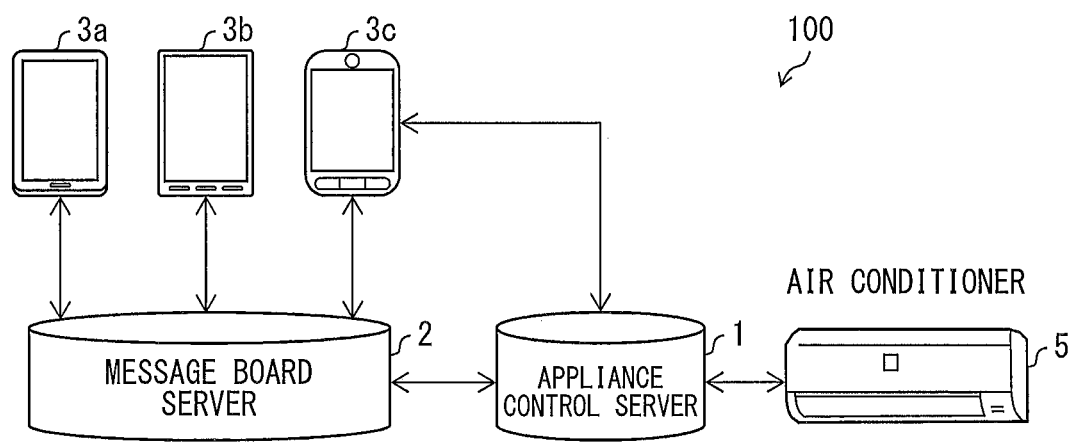
FIG. 3 is a diagram illustrating an overview of a configuration of main parts of the appliance control system in accordance with an embodiment of the present invention.

First, the configuration of the appliance control system 100 in accordance with an embodiment of the present invention will be described with reference to FIGS. 1 to 3 and FIG. 15. FIG. 1 is a block diagram illustrating a configuration of main parts of an appliance control server (notification device) in accordance with the present embodiment. FIG. 2 is a diagram schematically illustrating the appliance control system 100 in accordance with the present embodiment. FIG. 3 is a diagram illustrating an overview of a configuration of main parts of the appliance control system in accordance with the present embodiment. (a) of FIG. 15 is a block diagram illustrating a hardware configuration of a message board server in accordance with the present embodiment. (b) of FIG. 15 is a block diagram illustrating a hardware configuration of a mobile terminal in accordance with the present embodiment. (c) of FIG. 15 is a block diagram illustrating a hardware configuration of the appliance control server in accordance with the present embodiment.

(Overview of the Appliance Control System 100)

As illustrated in FIG. 1, the appliance control system 100 includes an appliance control server 1, a message board server (electronic message board server) 2, a mobile terminal 3, and an air conditioner 5 (electrical appliance). In the appliance control system 100, the mobile terminal 3 includes a plurality of mobile terminals, i.e., mobile terminals 3a, 3b, and 3c. In the present embodiment, the mobile terminals 3a, 3b, and 3c are mobile terminals for a father, a mother (named Fumi), and a child, respectively (see FIG. 2). Note that, in a house where the air conditioner 5 is provided, not only the air conditioner 5, but also other electrical appliance(s) such as a cleaning robot 4, a television set 6, and a lighting device 7 are provided. The appliance control server 1, the message board server 2, the mobile terminals 3, and the air conditioner 5 are intercommunicatively connected to one another via a network 10.

Note that although the descriptions in Embodiment 1 will take the air conditioner 5 as an example of an appliance to be controlled, the appliance to be controlled is not limited to the air conditioner 5, provided that it is configured to be capable of executing an operation signal transmitted from the appliance control server 1. The appliance to be controlled can be, for example, the cleaning robot 4, the television set 6, or the lighting device 7.

The mobile terminal 3 is used in an example case of the present embodiment. A terminal employed to implement the present invention, however, is not limited to a mobile terminal, provided that it is capable of showing an electronic message board and allowing a user to post a predetermined message, and can also include a stationary terminal (e.g. a personal computer or a television set allowing connection to a network).

With use of the appliance control system 100, a user of the mobile terminal 3 can perform a remote control of an electrical appliance by posting a predetermined message on an electronic message board, which is provided by the message board server 2 and is displayed on the mobile terminal 3. Details will be described later. Note that the electronic message board will be referred hereinafter to simply as "message board".

(Message Board)

In the present embodiment, the message board means a networking service offered to allow information exchanges among limited members. The limited members can be a small group of people including, for example, a family, close relatives, and the like people. Into a group of the message board (hereinafter also referred to as "home group"), not only members such as a family and close relatives (more specifically, mobile terminals used by the respective members), but also an electrical appliance(s) can be registered. In addition, the appliance control system 100 in accordance with the present embodiment is configured such that an electrical appliance(s) registered into the home group can be controlled to work under an instruction provided by any of the members through the message board.

As illustrated in (a) of FIG. 15, the message board server 2 includes a communication section 21, a control section 27, and a storage section 28. The communication section 21 is a communication interface that is provided to carry out IP communications with other device (e.g., appliance control server 1). The control section 27 is a CPU and executes various kinds of programs which are stored in the storage section 28 to implement a message board function (e.g. a message board managing section (message board managing means) 22) of the message board server 2. In other words, the control section 27 controls actions of the entire message board server 2. The storage section 28 is a storage medium storing therein those programs. In the present embodiment, the storage section 28 is a hard disk drive. However, the storage section 28 may be any other device of this kind.

The message board server 2 not only serves as a regular message board server but also notifies the message board of an operating status of an electrical appliance, in cooperation with the appliance control server 1 (notification device) that provides notification of an operating status of an electrical appliance. To implement such notification, the message board server 2 includes: a communication section 21, which serves as a message board control signal receiving section; and a message board managing section 22 (see FIG. 1).

The communication section 21 receives, from the appliance control server 1, a message board control signal for controlling the message board. The message board managing section 22 causes the message board to display thereon an object corresponding to the message board control signal received by the communication section 21. In a case where the communication section 21 receives a message board control signal which provides an instruction to display an object indicating that the appliance control server 1 has denied an operation indicated by an operation signal, which is received by the appliance control server 1, for operating an electrical appliance, the message board managing section 22 causes the electronic message board to display thereon the object indicating that the appliance control server 1 has denied that operation.

(Mobile Terminal 3)

As illustrated in (b) of FIG. 15, the mobile terminal 3 includes a communication section 31, a display section 35, an input section 36, a control section 37, and a storage section 38.

The communication section 31 is a communication interface that is provided to carry out IP communications with other device (e.g., appliance control server 1).

The control section 37 is a CPU and executes various kinds of programs which are stored in the storage section to implement individual functions of the mobile terminal 3. In other words, the control section 37 controls actions of the entire mobile terminal 3. The storage section 38 is a storage medium storing therein those programs. In the present embodiment, the storage section 38 is flash memory. However, the storage section 38 may be any other device of this kind.

The mobile terminal 3 displays the message board on the display section 35 and accepts a manipulation entered by the user with respect to the message board through the input section 36. More specifically, the display section 35 is a display section including a liquid crystal display panel and also serves as the input section 36 of touch panel type.

As illustrated in FIGS. 2 and 3, the mobile terminal 3 performs, under the user's manipulation, writing to the message board, showing up the message board, and others. Further, the mobile terminal 3 transmits, to the message board server 2, an operation signal indicative of a user's manipulation for causing the air conditioner 5 or the like electrical appliance, which serves as the appliance to be controlled, to work. In other words, the input section 36 accepts a user's manipulation and then outputs, to the control section 37, an operation signal, corresponding to the user's manipulation, for operating an electrical appliance, and the control section 37 causes the communication section 31 to transmit the operation signal to the message board server 2. Although details will be described later, the appliance control server 1 obtains the operation signal from the message board server 2 and feeds the operation signal to an electrical appliance (e.g. the air conditioner 5) which is to be controlled.

More specifically, the user of the mobile terminal 3 can select the air conditioner 5 as the appliance to be controlled, through the message board, from among electrical appliances registered in the home group and can select an action that the user intends to let the selected air conditioner 5 perform. The action selected by the mobile terminal 3 is notified to the air conditioner 5 via the message board server 2 and the appliance control server 1. In accordance with the notification, the air conditioner 5 performs the action selected on the mobile terminal 3.

In a case where the appliance control server 1 determines to deny the operation indicated by the operation signal, received by the appliance control server 1, for operating the electrical appliance, the display section 35 displays thereon an electronic message board which shows an object indicating that the operation has been denied. According to the above arrangement, the mobile terminal 3 can notify to the user that the operation has not been executed, by displaying thereon the electronic message board which shows the object indicating that the operation has been denied.

Further, the mobile terminal 3 may be configured to directly transmit, to the appliance control server 1, the operation signal indicating the user's manipulation for operating the appliance to be controlled, bypassing the message board server 2. Such a configuration may be provided by, for example, installing an appliance control application, which is an application for controlling actions of the appliance to be controlled, on the mobile terminal 3 in advance. Note that the appliance control application may include a function of providing notification of an operating status of the appliance to be controlled. FIGS. 2 and 3 each illustrate an example case of the mobile terminal 3c on which the appliance control application is installed. The mobile terminal 3c enables transmitting the operation signal to the appliance control server 1 via the message board server 2 and also enables directly transmitting the operation signal to the appliance control server 1 by means of the appliance control application.

(Air Conditioner 5)

In a Fumi's house, the air conditioner 5 is provided as one of electrical appliances, which are devices to be controlled (see FIG. 2). The descriptions of the present embodiment assume that Fumi, father (Fumi's husband), and her child are out while Fumi's father stays alone in the Fumi's house.

As described earlier, the air conditioner 5 is connected to the appliance control server 1 via the network 10 and is further registered into the home group of the message board. The method of allowing the user to operate the air conditioner 5 is not limited to operating the air conditioner 5 by means of a remote controller with which the air conditioner 5 is provided. The air conditioner 5 is also operable by the user by any of the following methods:

Transmit an operation signal to the air conditioner 5, which is the appliance to be controlled, through the message board; and Transmit an operation signal to the air conditioner 5, which is the appliance to be controlled, through an appliance control application.

For example, the Fumi's father staying in the house can operate the air conditioner 5 by means of the remote controller with which the air conditioner 5 is provided. Meanwhile, Fumi, who is not in the house, can operate the air conditioner 5 through the message board or the appliance control application, by using the mobile terminal 3b.

Specifically, the air conditioner 5 includes a communication section 51 and an air conditioning function section 52. The communication section 51, which serves as a control signal receiving section, carries out communications with the appliance control server 1 via the network 10. For example, the communication section 51 receives a control command that is generated by a control command generating section 15. Optionally, the communication section 51 may be configured to transmit, to the appliance control server 1, a status signal indicative of whether or not the air conditioner 5 is ready to accept the operation.

The air conditioning function section 52, which serves as operation executing means, is configured to implement an air conditioning function of the air conditioner 5. The operation of the air conditioning function section 52 may be realized in response to the control command received from the remote controller (not illustrated) with which the air conditioner 5 is provided or in response to the control command received from the appliance control server 1 through the communication section 51.

Alternatively, the air conditioning function section 52 may be configured to cause the communication section 51 to transmit, to the appliance control server 1, a status signal indicative of whether or not the air conditioning function section 52 is ready to accept the control command.

In the present embodiment, the appliance to be controlled is not limited to the air conditioner 5. As illustrated in FIG. 2, an electrical appliance(s) serving as the appliance to be controlled may be any device(s), provided that it is connected to the appliance control server 1 and registered into the home group, and may be, for example, the cleaning robot 4, the television set 6, or the lighting device 7. The time period required to complete the operation (operation completion period) varies depending upon the type of operations to be executed by the appliance to be controlled. Thus, a manufacturer of the appliance to be controlled needs to appropriately set respective operation completion periods for individual operations which are to be executed by the appliance to be controlled.

(Appliance Control Server 1)

As illustrated in (c) of FIG. 15, the appliance control server 1 includes a communication section (receiving section) 11, a control section 17, and a storage section 18. The communication section 11 is a communication interface that is provided to carry out IP communications with other device (e.g. the mobile terminal 3). The control section 17 is a CPU and executes various kinds of programs which are stored in the storage section 18 to implement individual functions (see FIG. 1) of the appliance control server 1. In other words, the control section 17 controls actions of the entire appliance control server 1. The storage section 18 is a storage medium storing therein those programs. In the present embodiment, the storage section 18 is a hard disk drive. However, the storage section 18 may be any other device of this kind.

As illustrated in FIG. 1, the appliance control server 1 includes the communication section 11, a display control section 12, an appliance command analyzing section 13, a status receiving section 14, the control command generating section 15, and a determining section 16.

The communication section 11 carries out communications with the message board server 2, the mobile terminal 3, and the air conditioner 5 via the network 10. For example, the communication section 11 receives, from the mobile terminal 3, an operation signal for operating the air conditioner 5, which is the appliance to be controlled. As described earlier, the communication section 11 may receive the operation signal directly from the mobile terminal 3 or may receive from the mobile terminal 3 via the message board server 2.

In the present embodiment, the appliance control server 1 can be provided at a place that is different from or identical to a house where the air conditioner 5 is provided. In a case where the appliance control server 1 is provided at the place that is different from the house where the air conditioner 5 is provided, communications between the appliance control server 1 and the air conditioner 5 are made via the network 10. On the other hand, in a case where the appliance control server 1 is provided at the place that is identical to the house where the air conditioner 5 is provided, communications between the communication section 11 of the appliance control server 1 and the communication section 51 of the air conditioner 5 may be implemented, not via the network 10, via another communication means (e.g. LAN provided in the house). As described above, the communication means used for the appliance control server 1 and for the appliance to be controlled is not limited to a single communication means and can be appropriately selected depending upon a place where the appliance control server 1 is provided and an aspect of the appliance to be controlled.

The appliance command analyzing section 13 extracts a portion of the received operation signal, which portion serves as a subject of the determination made by the determining section 16, and then feeds that portion to the determining section 16. Note that the determining section may be configured to include the function of the appliance command analyzing section 13.

The status receiving section 14 is a section to receive, from the air conditioner 5, a status signal indicative of whether or not the air conditioner 5 is ready to accept the operation. The determining section 16, which will be described later, may be configured to refer to a status signal received from the status receiving section 14, when determining whether or not an operation indicated by an incoming operation signal should be denied.

The determining section 16 is determining means for determining whether or not an operation indicated by an operation signal which is received by the communication section 11 should be denied. In other words, the determining section 16 determines whether or not the air conditioner 5 is ready to execute the operation indicated by the operation signal which is received by the communication section 11. Although details of the determination process carried out by the determining section 16 will be described later, the determining section 16 determines that an operation indicated by the operation signal which is received by the communication section 11 should be denied, when it is desirable for the air conditioner 5 not to execute that operation or when the air conditioner 5 is not ready to execute that operation.

Upon determining that the operation indicated by the operation signal should be denied, the determining section 16 outputs a result of the determination to the display control section 12. On the other hand, upon determining that the operation indicated by the operation signal is not to be denied, that is, upon determining that the air conditioner 5 is ready to execute the operation indicated by the operation signal, the determining section 16 outputs a result of the determination to the control command generating section 15.

The display control section 12 is display control means for causing the message board to display thereon, based on a determination result notified by the determining section 16, at least one of the followings:

(1) a character string representing the determination result;
(2) an image representing the determination result (a still image, a moving image, an icon, and/or the like);
(3) a combination of the character string and the image; and
(4) a combination of at least one of the (1) character string (1) and the (2) image and information of a link destination from which large-volume data, such as a moving image and a sound, can be downloaded and played back in response to a user's manipulation.

Hereinafter, the above items (1) through (4) are all referred to as "objects". In other words, the display control section 12 converts an object representing the determination result notified by the determining section 16 into data in a format processible by the message board server 2, and then causes the communication section 11 to output that data to the message board server 2.

Note that the display control section 12 may be configured to generate an object in a format displayable on the message board and then transmit the object thus generated to the message board server 2. Alternatively, the display control section 12 may be configured to generate data required to cause the message board to display thereon an object and then transmit the data thus generated to the message board server 2. In this arrangement, the message board server 2 is configured to generate an object based on the data received from the display control section 12 and causes the message board to display thereon the object thus generated.

Upon receipt of a determination result indicating that an operation indicated by an operation signal is ready to be executed from the determining section 16, the control command generating section 15, which serves as control signal generating means, generates a control command (control signal) for causing the air conditioner 5 to execute the operation indicated by the operation signal and then causes the communication section 11 to output the control command to the air conditioner 5.

In the present embodiment, the blocks (the communication section 11, the display control section 12, the control command generating section 15, and the determining section 16) for implementing the notification device are provided collectively in the appliance control server 1. Alternatively, one of the arrangement (i) in which the blocks may be provided separately in a plurality of devices and the arrangement (ii) in which the blocks may be provided collectively in the appliance to be controlled may be adopted, provided that the arrangements (i) and (ii) allow the notification device to be implementable. The arrangements (i) and (ii) will be described in Embodiment 2.

(Operation that should be Denied)

The determining section 16 determines whether or not an operation indicated by an operation signal of interest which is received in the reception step, which is performed by the communication section 11, should be denied, in accordance with a determination criterion associated with an operation indicated by a previously received operation signal which precedes the operation signal of interest. The following description will deal with an operation that should be denied of operations indicated by individual operation signals received by the communication section 11.

(Operation 1 Accepted During Exclusive Time Period)

The air conditioning function section 52 requires an operation completion period, which is a predetermined time period required to complete a given operation instructed by a control command to execute after accepting the control command. It is an unfavorable situation that the air conditioning function section 52 accepts a control command corresponding to a newly received operation signal in the middle of executing the operation indicated by a previously received operation signal. To avoid such an unfavorable situation for the air conditioning function section 52, the determining section 16 determines that the operation indicated by the newly received operation signal should be denied.

The determining section 16 may be configured to refer to a table in which operations to be executed by the air conditioning function section 52 and their respective operation completion periods which are time periods required to complete these individual operations are associated with each other. In a case where the determining section 16 determines that an operation indicated by the received operation signal should not be denied (i.e. should be permitted), the determining section 16 reads an operation completion period associated with that operation from the table and then set the operation completion period thus read as an exclusive time period of the air conditioning function section 52. In other words, the exclusive time period is associated with the operation indicated by the previously received operation signal. Further, whether or not an operation signal has been received within the exclusive time period is an example of the determination criterion for the determination as to whether or not the operation signal should be denied.

The aforementioned operation completion period varies depending upon the type of operations, and examples of the operation completion period include:

a few seconds for change of a temperature setting:

a few seconds for switching of air flow volume or air flow direction;

a few seconds for power-on or power-off of the air conditioner 5;

a few seconds for a timer setting;

10 seconds for switching of operation modes, e.g. cooling mode, heating mode, and dehumidification mode; and 5 minutes for self-cleaning of an interior of the air conditioner 5.

The air conditioning function section 52 may be configured to, upon accepting a control command corresponding to an operation signal, transmit, to the appliance control server 1, a status signal indicating that the air conditioning function section 52 is not ready to accept a new operation command until an operation completion period corresponding to that control command lapses after the acceptance of that control command. The status receiving section 14 feeds the incoming status signal to the determining section 16. The determining section 16 may be configured to set the exclusive time period of the air conditioning function section 52 on the basis of the status signal.

Further alternatively, the air conditioning function section 52 may be configured to, upon accepting a control command corresponding to an operation signal, transmit, to the appliance control server 1, a status signal indicating that the air conditioning function section 52 is not ready to accept a new operation command. The determining section 16 initiates the exclusive time period of the air conditioning function section 52 on the basis of the status signal. In this arrangement, upon completing the execution of the operation, the air conditioning function section 52 transmits, to the appliance control server 1, a status signal indicating that the air conditioning function section is ready to accept a new operation command. The determining section 16 terminates the exclusive time period of the air conditioning function section 52 on the basis of the status signal.

For example, assume that the father first provides an instruction for cleaning the interior of the air conditioner 5, and Fumi then provides an instruction for turning on the air conditioner 5 during the exclusive time period set for the cleaning of the interior of the air conditioner 5. In this case, the determining section 16 denies an operation corresponding to the instruction from Fumi to turn on the air conditioner 5. In this arrangement, upon receipt of the determination result from the determining section 16, the display control section 12 may cause the message board to display thereon an object containing a character string saying "The instruction from Fumi to turn on the air conditioner cannot be accepted as the air conditioner is now cleaning its interior in response to the instruction from the father. The cleaning will be finished in 3 minutes. Please retry later."

In other words, the display control section 12 preferably causes the message board to display thereon an object containing (1) information indicating which user has previously instructed to execute an operation, (2) what kind of operation the previously instructed operation is, (3) information indicating that an operation currently instructed has been denied, (4) information indicating which user provided an instruction to execute the operation having been denied, (5) information indicating a time period taken until another operation gets ready to be accepted, and (6) information prompting a retry of providing an instruction to execute the operation if necessary. The object contains at least the information (3) although the content of the object to be displayed on the message board by the display control section 12 can be selected appropriately.

(Operation 2 Accepted During Exclusive Time Period)

Another aspect of the process of setting the exclusive time period in the present embodiment will be described. The determining section 16 may be configured to carry out the process of setting the exclusive time period as described below.

In a case where the determining section 16 determines that the air conditioning function section 52 is ready to execute an operation indicated by an operation signal, the determining section 16 feeds the determination result to the control command generating section 15 and sets the exclusive time period of the air conditioning function section 52. Further, the determining section 16 causes the display control section 12 to transmit, to the message board server 2, information indicating that the operation indicated by the operation signal has been accepted.

The message board server 2 causes the message board to display thereon an object indicating that the operation indicated by the operation signal has been accepted, and transmits, to the appliance control server 1, a display completion notification indicating that displaying the object has been completed.

Upon receipt of the display completion notification through the communication section 11, the determining section 16 terminates the exclusive time period of the air conditioning function section 52.

According to the above arrangement, upon determining that the air conditioning function section 52 is ready to execute the operation indicated by the operation signal, the determining section 16 sets the exclusive time period of the air conditioning function section 52. Further, upon receipt of the notification that the message board server 2 has caused the message board to display thereon the object indicating that the operation indicated by the operation signal has been accepted, the determining section 16 terminates the exclusive time period of the air conditioning function section 52. That is, the determining section 16 may be configured to set, as the exclusive time period, a time period required from the acceptance of an operation indicated by an operation signal to the completion of displaying on the message board that the operation has been accepted. The determining section 16 denies an operation indicated by an operation signal that is newly received during that exclusive time period.

(Attributes of Operations)

Operations involving air conditioners have various kinds of attributes. Examples of the attributes of the operations involving the air conditioners include temperature setting, power-on/off, timer setting, operation mode (e.g. cooling mode, heating mode, and dehumidification mode).

Assume that operations instructed from separate mobile terminals of a plurality of users, the operations being identical in attribute, are all permitted by the appliance control server. This can generally lead to unfavorable result for all of the users. Now consider, as an example of executing a plurality of operations being identical in attribute, a case where an operation signal indicating an operation to decrease the setting temperature is transmitted from the mobile terminal 3a of the father, while another operation signal indicating an operation to decrease the setting temperature is transmitted from the mobile terminal 3c of the child. In this case, since the appliance control server accepts the respective operations indicated by both of the operation signals, the resulting setting temperature of the air conditioner is lower than temperatures expected by the father and the child. This must be unsatisfactory result for both of the users.

In view of this, the determining section 16 is preferably configured to deny an operation indicated by a newly received operation signal, if the newly received operation signal is (i) identical in attribute to an operation indicated by a previously received operation signal and (ii) is received before lapse of a predetermined time period from a point in time when the previously received operation signal is received. The predetermined time period is preferably a time period associated with the operation indicated by the previously received operation signal. Further, the predetermined time period may be associated with an attribute of an operation indicated by an operation signal.

In this case, in response to a result of the determination made by the determining section 16, the display control section 12 is preferably configured to cause the message board to display thereon an object containing a character string saying "The air conditioner cannot accept the instruction from the child to change the setting temperature. This is because, under the instruction from the father, the air conditioner decreased the setting temperature to 24° C. immediately before receiving the instruction from the child. If you want to further decrease the setting temperature, please retry the instruction."

In other words, the display control section 12 preferably causes the message board to display thereon an object containing (1) information indicating which user has previously instructed to execute an operation, (2) what kind of operation the previously instructed operation is, (3) information indicating that an operation currently instructed has been denied, (4) information indicating which user provided an instruction to execute the operation having been denied, and (5) information prompting a retry of providing an instruction to execute the operation if necessary. The object contains at least the information (3) although the content of the object to be displayed on the message board by the display control section 12 can be selected appropriately.

Figure 4:
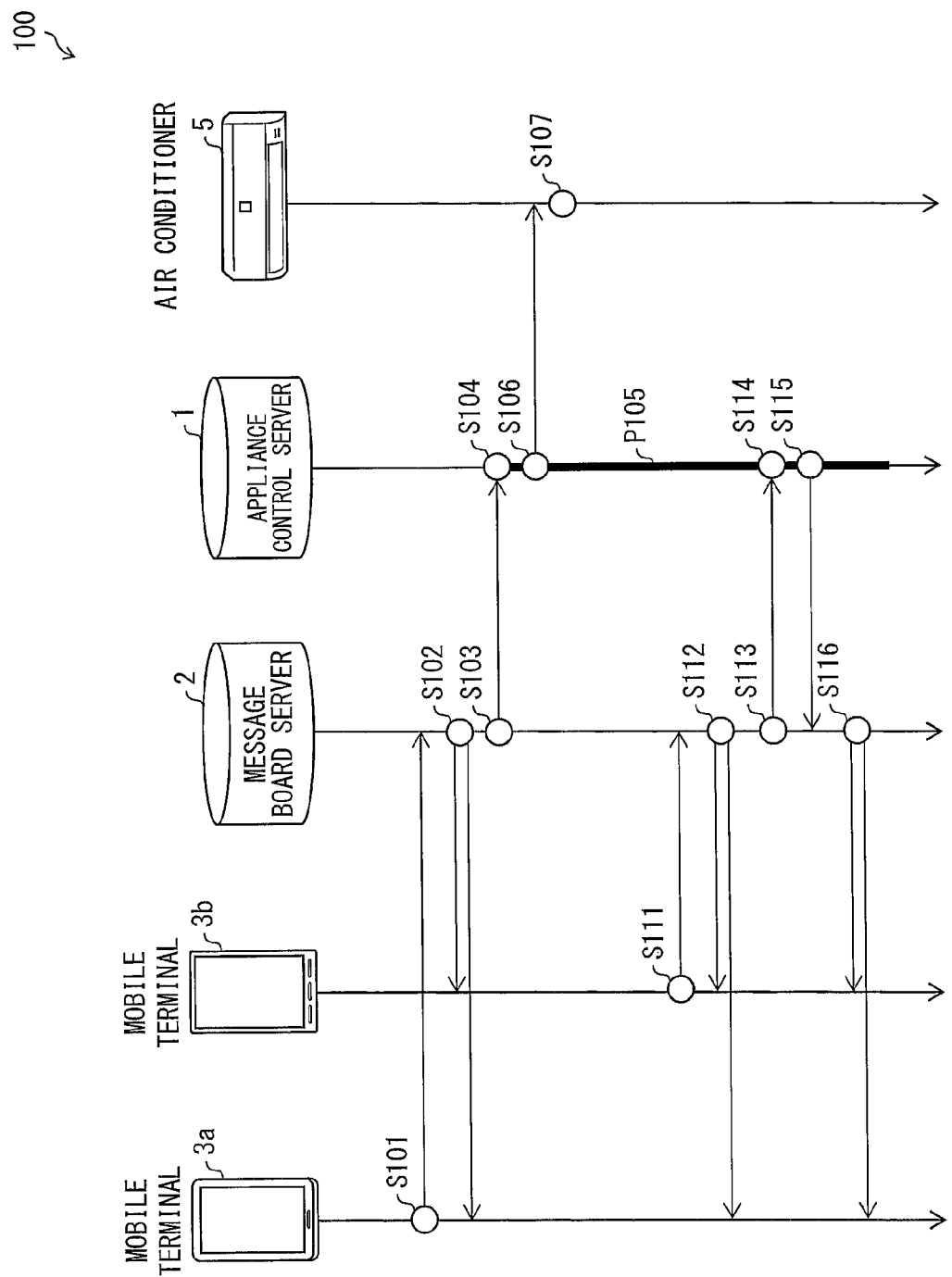
FIG. 4 is a sequence diagram showing the flow of the procedure of appliance control performed in the appliance control system in accordance with an embodiment of the present invention.

The following will describe a series of steps of appliance control performed in the appliance control system 100 with reference to FIG. 4. FIG. 4 is a sequence diagram showing the flow of the procedure of appliance control performed in the appliance control system 100. Note that the following descriptions of the present embodiment assume that the mobile terminals 3a and 3b each output an operation signal for operating the air conditioner 5 to the appliance control server 1 via the message board.

The mobile terminal 3a transmits, to the message board server 2, a temperature increase signal corresponding to an operation for causing the air conditioner 5 to increase the setting temperature (step S101).

The message board server 2 causes the message board to display thereon a message indicating that the message board server 2 has received the temperature increase signal from the mobile terminal 3a (step S102).

The message board server 2 transmits the temperature increase signal to the appliance control server 1, and the communication section 11 of the appliance control server 1 then receives the temperature increase signal (step S103, step (a)).

The determining section 16 of the appliance control server 1 determines whether or not the operation for causing the air conditioner 5 to increase the setting temperature should be denied (step S104, step (b)). Given that this timing falls outside the exclusive time period of the air conditioner 5, the determining section 16 determines that the operation for causing the air conditioner 5 to increase the setting temperature should not be denied (i.e. should be permitted). At this time, the determining section 16 sets an exclusive time period P105 as a predetermined time period required to complete the operation for causing the air conditioner 5 to increase the setting temperature.

In response to a result of the determination made by the determining section 16 to permit the operation, the control command generating section 15 generates a temperature increase command for causing the air conditioner 5 to increase the setting temperature and then transmits the temperature increase command thus generated to the air conditioner 5 (step S106).

The air conditioner 5 accepts the temperature increase command and then increases the setting temperature (step S107).

The mobile terminal 3b transmits, to the message board server 2, a temperature decrease signal corresponding to an operation for causing the air conditioner 5 to decrease the setting temperature (step S111).

The message board server 2 causes the message board to display thereon a message indicating that the message board server 2 has received the temperature decrease signal from the mobile terminal 3b (step S112).

The message board server 2 transmits the temperature decrease signal to the appliance control server 1, and the communication section 11 of the appliance control server 1 then receives the temperature decrease signal (step S113, step (a)).

The determining section 16 of the appliance control server 1 determines whether or not the operation for causing the air conditioner 5 to decrease the setting temperature should be denied (step S114, step (b)). Given that this timing falls within the exclusive time period P105 of the air conditioner 5, the determining section 16 determines that the operation for causing the air conditioner 5 to decrease the setting temperature should be denied.

In response to a result of the determination made by the determining section 16, the display control section 12 transmits, to the message board server 2, a signal indicating that the operation for causing the air conditioner 5 to decrease the setting temperature is to be denied (step S115).

The message board server 2 causes the message board to display thereon an object indicating that the operation for causing the air conditioner 5 to decrease the setting temperature has not been accepted (step S116, step (c)).

Note that in response to the event of the message board server 2 displaying the object (step S116), a notification that display update of the message board is done may be displayed on the mobile terminal. The notification may contain whole or part of the object displayed on the message board. In an arrangement in which the notification contains the object, the mobile terminal displays or plays back the object. In an arrangement in which the object contains a link, the mobile terminal may be configured to automatically download data from a link destination and play back the data. The notification that display update of the message board is done may be obtained by polling made by the mobile terminal or by push transmission from the message board server 2. In particular, it is an effective that the notification is displayed on the mobile terminal 3*b*, which is a source of the temperature decrease signal whose corresponding operation has been denied.

Figure 5:
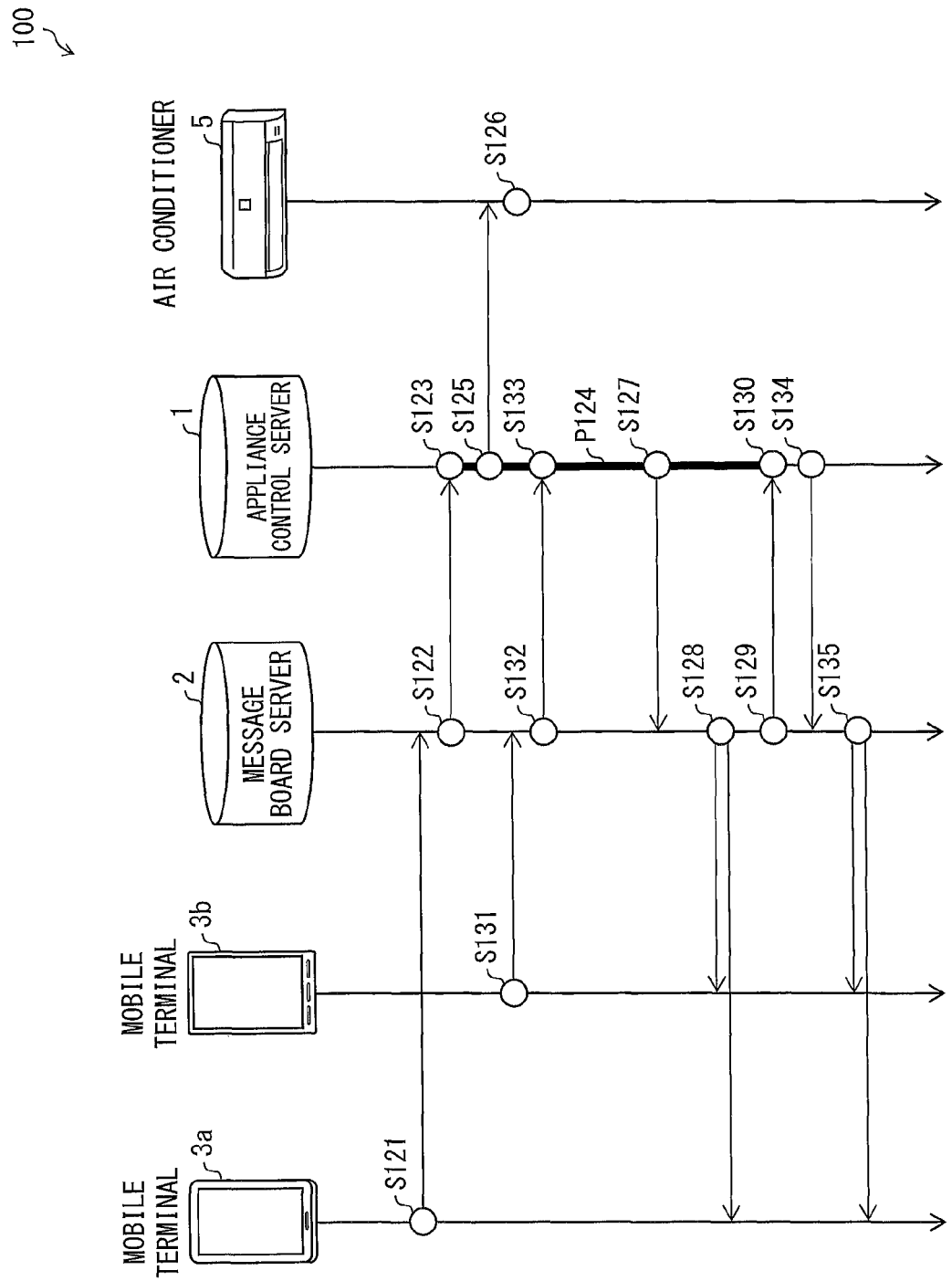
FIG. 5 is a sequence diagram showing the flow of the procedure of appliance control performed in the appliance control system in accordance with an embodiment of the present invention.

The following will describe a series of steps of another appliance control performed in the appliance control system 100 with reference to FIG. 5. FIG. 5 is a sequence diagram showing the flow of the procedure of appliance control performed in the appliance control system 100.

The mobile terminal 3*a* transmits, to the message board server 2, a temperature increase signal corresponding to an operation for causing the air conditioner 5 to increase the setting temperature (step S121).

The message board server 2 transmits the temperature increase signal to the appliance control server 1, and the communication section 11 of the appliance control server 1 receives the temperature increase signal (step S122, step (a)).

The determining section 16 of the appliance control server 1 determines whether or not the operation for causing the air conditioner 5 to increase the setting temperature should be denied (step S123, step (b)). Given that this timing falls outside the exclusive time period of the air conditioner 5, the determining section 16 determines that the operation for causing the air conditioner 5 to increase the setting temperature should not be denied (i.e. should be permitted) and then sets an exclusive time period P124 of the air conditioning function section 52.

In response to a result of the determination made by the determining section 16 to permit the operation, the control command generating section 15 generates a temperature increase command for increasing the setting temperature of the air conditioner 5 and then transmits the temperature increase command thus generated to the air conditioner 5 (step S125).

The air conditioner 5 accepts the temperature increase command and then increases the setting temperature (step S126).

The determining section 16 causes the display control section 12 to transmit a signal indicating the acceptance of the temperature increase command to the message board server 2 (step S127). At this time, the display control section 12 instructs the message board server 2 to transmit, upon completion of displaying the object on the message board, the display completion notification to the appliance control server 1.

The message board server 2 causes the message board to display thereon an object indicating the acceptance of the temperature increase command (step S128). Further, the message board server 2 transmits, to the appliance control server 1, the display completion notification indicating that displaying the object on the message board has been completed (step S129).

Upon receipt of the display completion notification through the communication section 11, the determining section 16 terminates the exclusive time period of the air conditioning function section 52 (step S130).

The mobile terminal 3*b* transmits, to the message board server 2, a temperature decrease signal corresponding to an operation for causing the air conditioner 5 to decrease the setting temperature (step S131). The transmission of the temperature decrease signal by the mobile terminal 3*b* is made immediately after the mobile terminal 3*a* has transmitted the temperature increase signal.

The message board server 2 transmits the temperature decrease signal to the appliance control server 1, and the communication section 11 of the appliance control server 1 then receives the temperature decrease signal (step S132, step (a)).

The determining section 16 of the appliance control server 1 determines whether or not the operation for causing the air conditioner 5 to decrease the setting temperature should be denied (step S133, step (b)). Given that this timing falls within the exclusive time period P124 of the air conditioner 5, the determining section 16 determines that the operation for causing the air conditioner 5 to decrease the setting temperature should be denied.

In response to a result of the determination made by the determining section 16, the display control section 12 transmits, to the message board server 2, a signal indicating that the operation for causing the air conditioner 5 to decrease the setting temperature is to be denied (step S134). Note that in a case where a message indicating that the operation indicated by the operation signal is to be denied is displayed on the message board, the display control section 12 does not need to instruct the message board server 2 to transmit the display completion notification to the appliance control server 1.

The message board server 2 causes the message board to display thereon an object indicating that the operation for causing the air conditioner 5 to decrease the setting temperature has not been accepted (step S135, step (c)).

Note that in response to the event of the message board server 2 displaying the object (step S135), a notification that display update of the message board is done may be displayed on the mobile terminal. The notification may contain whole or part of the object displayed on the message board. In an arrangement in which the notification contains the object, the mobile terminal displays or plays back the object. In an arrangement in which the object contains a link, the mobile terminal may be configured to automatically download data from a link destination and play back the data. The notification that display update of the message board is done may be obtained by polling made by the mobile terminal or by push transmission from the message board server 2. In particular, it is an effective that the notification is displayed on the mobile terminal 3*b*, which is a source of the temperature decrease signal whose corresponding operation has been denied.

Embodiment 2

Figure 6:
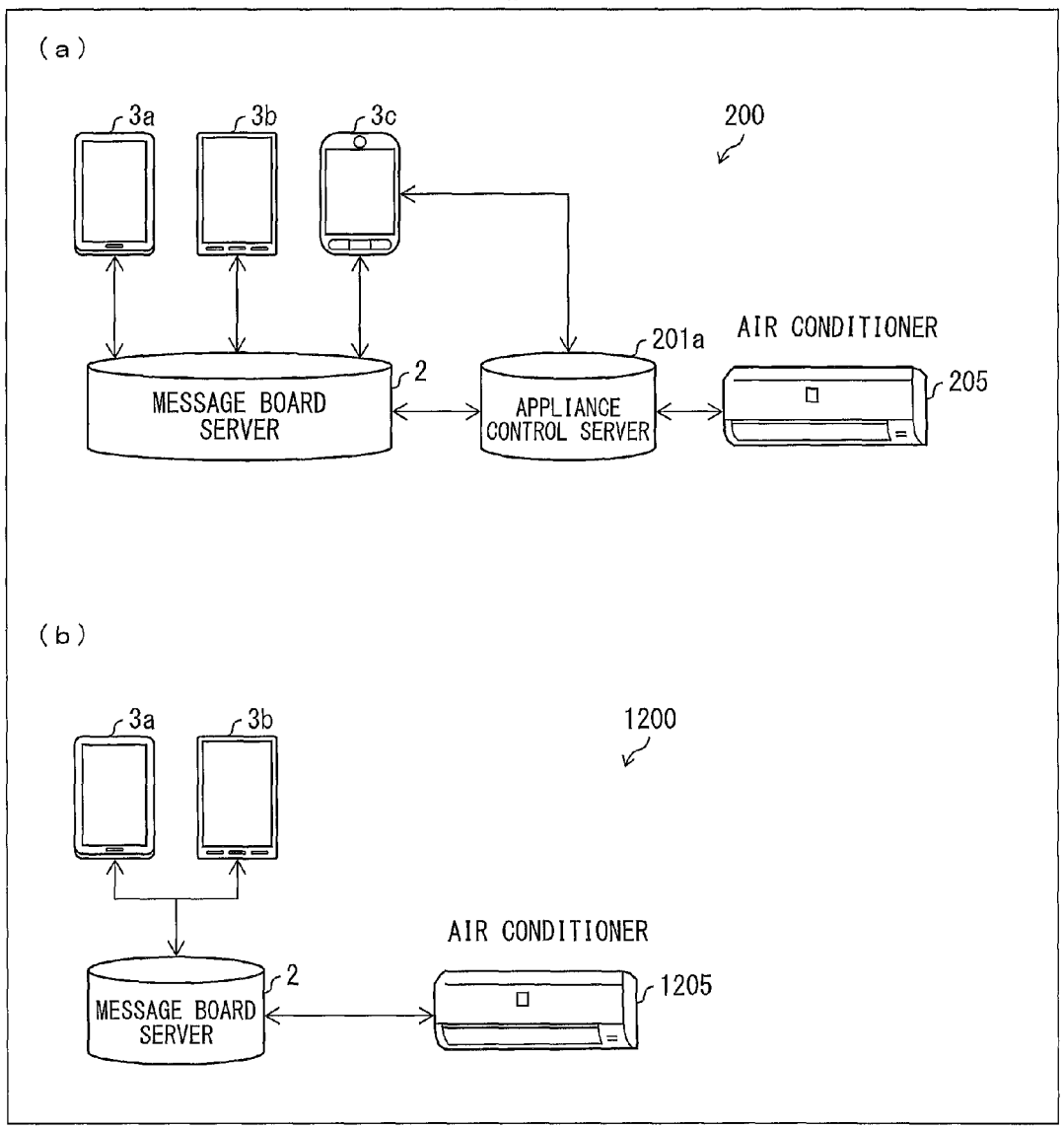
FIG. 6 is a diagram illustrating an overview of configuration of main parts of an appliance control system in accordance with an embodiment of the present invention.
Figure 7:
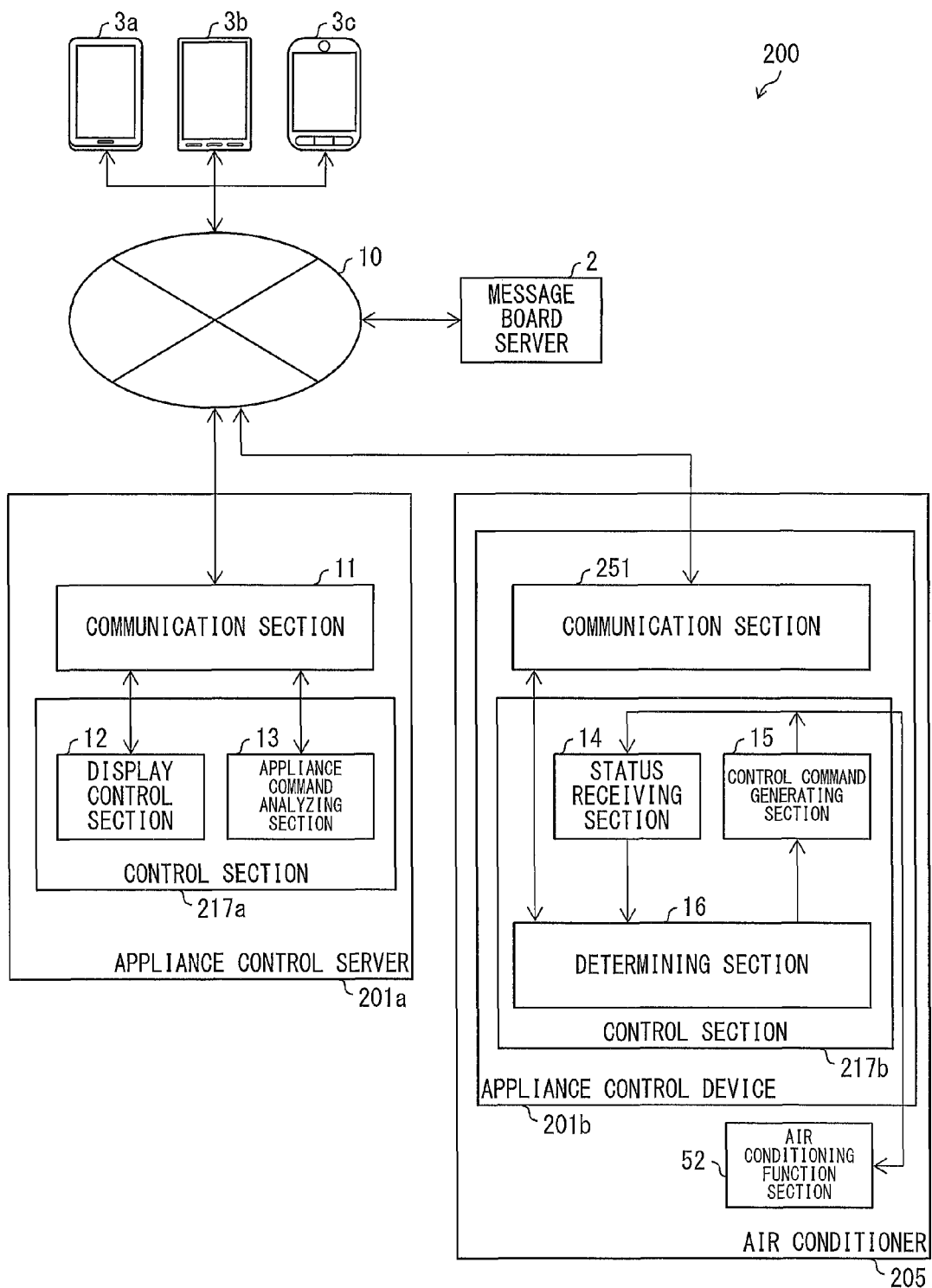
FIG. 7 is a block diagram illustrating a configuration of main parts of an appliance control device in accordance with an embodiment of the present invention.
Figure 8:
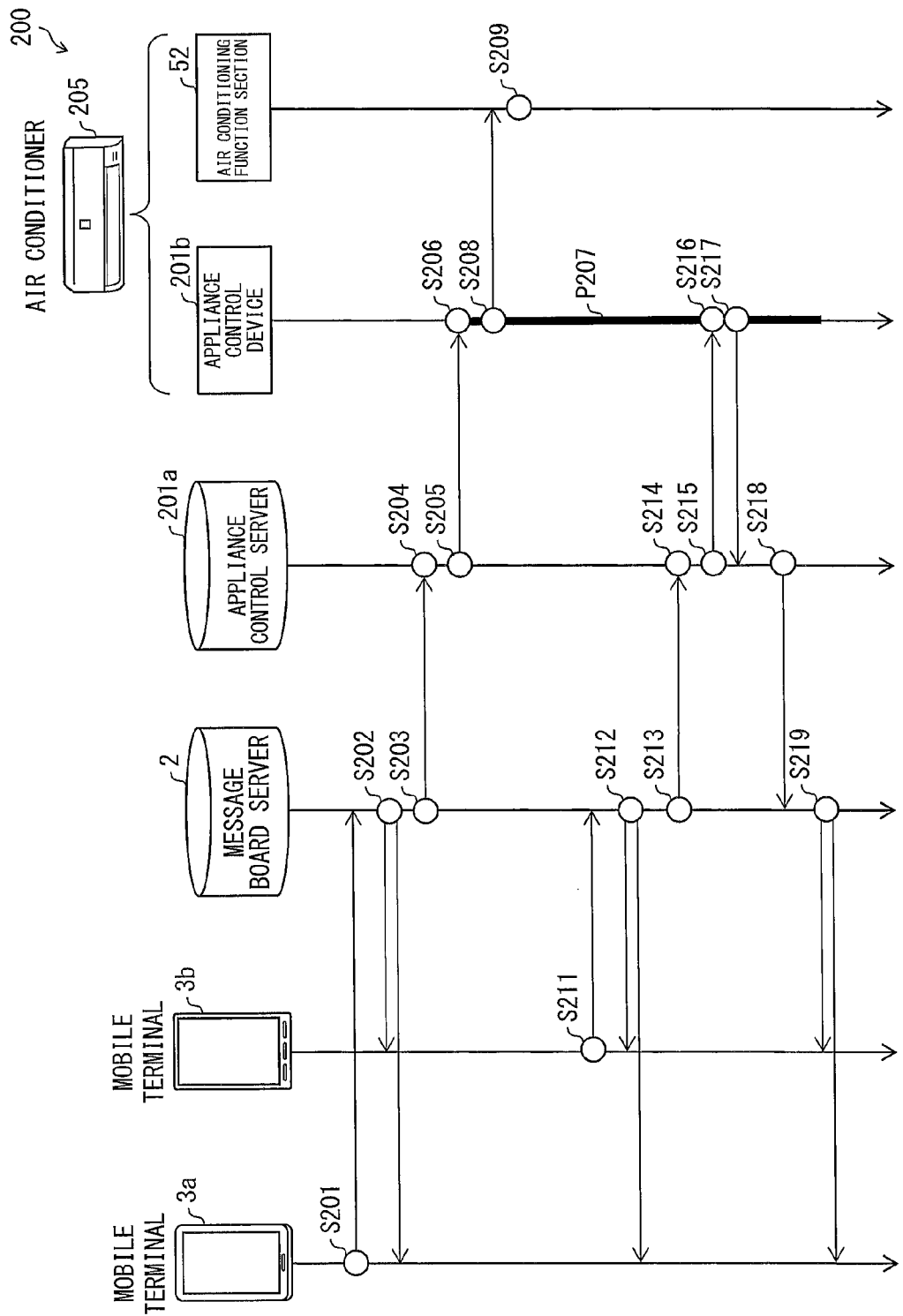
FIG. 8 is a sequence diagram showing the flow of the procedure of appliance control performed in an appliance control system in accordance with an embodiment of the present invention.

The following will describe an appliance control system (notification system) in accordance with Embodiment 2 with reference to FIGS. 6 to 10 and FIG. 16. For convenience of explanation, members of Embodiment 2 that are identical in function to their respective corresponding members described in Embodiment 1 are each assigned a common reference numeral, and are not described here. FIG. 6 is a diagram illustrating an overview of a configuration of main parts of the appliance control system in accordance with Embodiment 2. FIG. 7 is a block diagram illustrating a configuration of main parts of an air conditioner 205 illustrated in (a) of FIG. 6. FIG. 8 is a sequence diagram showing the flow of the procedure of appliance control performed in the appliance control system 200.

In the appliance control system 200 illustrated in (a) of FIG. 6, the individual blocks (the communication section, the display control section, the control command generating section, and the determining section) for implementing the notification device are provided separately in different units. The appliance control system 200 is, for example, configured such that the determining section 16 for determining whether or not an operation indicated by an operation signal which is obtained from the mobile terminal 3 should be denied is provided in the air conditioner 205, and the display control section 12 for causing the message board to display thereon an object based on a determination result obtained by the determining section 16 is provided in an appliance control server 201a. Detailed descriptions will be provided with reference to FIG. 7.

In the appliance control system 1200 illustrated in (b) of FIG. 6, the individual blocks for implementing the notification device are provided in an air conditioner 1205, which is an appliance to be controlled. Detailed descriptions will be provided with reference to FIG. 9.

(Appliance Control System 200)

The appliance control system 200 includes mobile terminals 3a, 3b, and 3c, a message board server 2, the appliance control server 201a (notification device), and the air conditioner 205. As in the case with the appliance control system 100, the mobile terminals 3a, 3b, and 3c are each capable of transmitting an operation signal for operating the air conditioner 205, to the appliance control server 201a via the message board server 2. The mobile terminal 3c, where an appliance control application is installed in advance, is capable of transmitting the operation signal for operating the air conditioner 205, to the appliance control server 201a via the appliance control application.

The appliance control server 201a, as is the case with the appliance control server 1 in accordance with Embodiment 1, includes a communication section 11, a control section 217a, and a storage section 18. The control section 217a executes various kinds of programs which are stored in the storage section 18 to implement respective functions of a display control section 12 and an appliance command analyzing section 13, which are illustrated in FIG. 7.

The control section 217a of the appliance control server 201a includes the display control section 12, and the appliance command analyzing section 13.

As illustrated in FIG. 16, the air conditioner 205 includes a communication section 251, a control section 217b, a storage section 218, and an air conditioning function section 52. FIG. 16 is a block diagram illustrating a hardware configuration of the air conditioner 205. The control section 217b executes various kinds of programs which are stored in the storage section 218 to implement respective functions of a status receiving section 14, a control command generating section 15, and a determining section 16, which are illustrated in FIG. 7.

It can be said that the air conditioner 205 includes an appliance control device 201b and the air conditioning function section 52. The appliance control device 201b includes the communication section 251, the status receiving section 14, the control command generating section 15, and the determining section 16.

The communication section 11 feeds, to the appliance command analyzing section 13, the operation signal received from the message board server 2, and then receives the operation signal subjected to conversion by the appliance command analyzing section 13. The communication section 11 transmits the converted operation signal to the air conditioner 205.

The communication section 251 receives the converted operation signal from the appliance control server 201a and then feeds the operation signal to the determining section 16.

The determining section 16 is determining means for determining whether or not an operation indicated by the operation signal which is received by the communication section 251 should be denied. Upon determining that the operation indicated by the operation signal should be denied, the determining section 16 transmits a result of the determination to the appliance control server 201a. In the appliance control server 201a, the display control section 12 receives the determination result through the communication section 11. The display control section 12 causes the message board to display thereon an object based on the determination result. On the other hand, upon determining that the operation indicated by the operation signal should not be denied, i.e. upon determining that the operation indicated by the operation signal is ready to be executed, the determining section 16 outputs the determination result to the control command generating section 15.

Upon receipt of the determination result indicating that the operation indicated by the operation signal is ready to be executed from the determining section 16, the control command generating section 15 generates a control command (control signal) for causing the air conditioner 205 to execute the operation indicated by the operation signal and then transmits the control command thus generated to the air conditioning function section 52. Optionally, the status receiving section 14 may be configured to receive, from the air conditioning function section 52, a status signal indicative of whether or not the air conditioning function section 52 is ready to accept the operation.

Note that the display control section 12 provided in the appliance control system 200 is preferably configured to generate minimum data required to display on the message board and then transmit the data thus generated to the message board server 2. The minimum data required to display on the message board may be a code represented by a character string like "E500", for example. In this arrangement, the message board server 2 preferably stores therein objects which are respectively associated with codes. The message board server 2 selects an object which is associated with a code received from the display control section 12, and then causes the message board to display the object thereon.

According to the above arrangement, the display control section 12 provided in the appliance control system 200 may generate a code represented by a character string rather than an object in a format displayable on the message board. Thus, the display control section 12 configured to generate a code can be realized with a simpler structure than the display control section configured to generate the object.

The following will describe a series of steps of appliance control performed in the appliance control system 200 with reference to FIG. 8. FIG. 8 is a sequence diagram showing the flow of the procedure of appliance control performed in the appliance control system 200.

The mobile terminal 3a transmits, to the message board server 2, a temperature increase signal that is an operation signal corresponding to an operation for causing the air conditioning function section 52 provided in the air conditioner 205 to increase the setting temperature (step S201).

The message board server 2 causes the message board to display thereon an object indicating that the temperature increase signal has been received from the mobile terminal 3a (step S202).

The message board server 2 transmits the temperature increase signal to the appliance control server 201a, and the communication section 11 of the appliance control server 201a then receives the temperature increase signal (step S203, step (a)).

The appliance command analyzing section 13 of the appliance control server 201a converts the incoming temperature increase signal (step S204) and then causes the communication section 11 to transmit the temperature increase signal thus converted to the appliance control device 201b of the air conditioner 205 (step S205).

The determining section 16 of the appliance control device 201b determines whether or not the operation for causing the air conditioning function section 52 to increase the setting temperature should be denied (step S206, step (b)). Given that this timing falls outside the exclusive time period of the air conditioning function section 52, the determining section 16 determines that the operation for causing the air conditioning function section to increase the setting temperature should not be denied (i.e. should be permitted). At this time, the determining section 16 sets an exclusive time period P207 as a predetermined time period required to complete the operation for causing the air conditioning function section 52 to increase the setting temperature.

In response to a result of the determination made by the determining section 16 to permit the operation, the control command generating section 15 generates a temperature increase command (control command) for causing the air conditioning function section 52 to increase the setting temperature and then transmits the temperature increase command thus generated to the air conditioning function section 52 (step S208).

The air conditioning function section 52 accepts the temperature increase command and then increases the setting temperature (step S209).

The mobile terminal 3b transmits, to the message board server 2, a temperature decrease signal (operation signal) corresponding to an operation for causing the air conditioning function section 52 to decrease the setting temperature (step S211).

The message board server 2 causes the message board to display thereon an object indicating that the message board server 2 has received the temperature decrease signal from the mobile terminal 3b (step S212).

The message board server 2 transmits the temperature decrease signal to the appliance control server 201a, and the communication section 11 of the appliance control server 201a then receives the temperature decrease signal (step S213, step (a)).

The appliance command analyzing section 13 of the appliance control server 201a converts the incoming temperature decrease signal (step S214) and then causes the communication section 11 to transmit the converted temperature decrease signal to the appliance control device 201b of the air conditioner 205 (step S215).

The determining section 16 of the appliance control device 201b determines whether or not the operation for causing the air conditioning function section 52 to decrease the setting temperature should be denied (step S216, step (b)). Given that this timing falls within the exclusive time period P207 of the air conditioning function section 52, the determining section 16 determines that the operation for causing the air conditioning function section 52 to decrease the setting temperature should be denied.

The determining section 16 causes the communication section 251 to transmit the determination result to the appliance control server 201a (step 217).

In response to a result of the determination made by the determining section 16, the display control section 12 transmits, to the message board server 2, a signal indicating that the operation for causing the air conditioning function section 52 to decrease the setting temperature is to be denied (step S218).

The message board server 2 causes the message board to display thereon an object indicating that the operation for causing the air conditioning function section 52 to decrease the setting temperature has not been accepted (step S219, step (c)).

Note that in response to the event of the message board server 2 displaying the object (step S219), a notification that display update of the message board is done may be displayed on the mobile terminal. The notification may contain whole or part of the object displayed on the message board. In an arrangement in which the notification contains the object, the mobile terminal displays or plays back the object. In an arrangement in which the object contains a link, the mobile terminal may be configured to automatically download data from a link destination and play back the data. The notification that display update of the message board is done may be obtained by polling made by the mobile terminal or by push transmission from the message board server 2. In particular, it is an effective that the notification is displayed on the mobile terminal 3b, which is a source of the temperature decrease signal whose corresponding operation has been denied.

Modification Example 1

Figure 9:
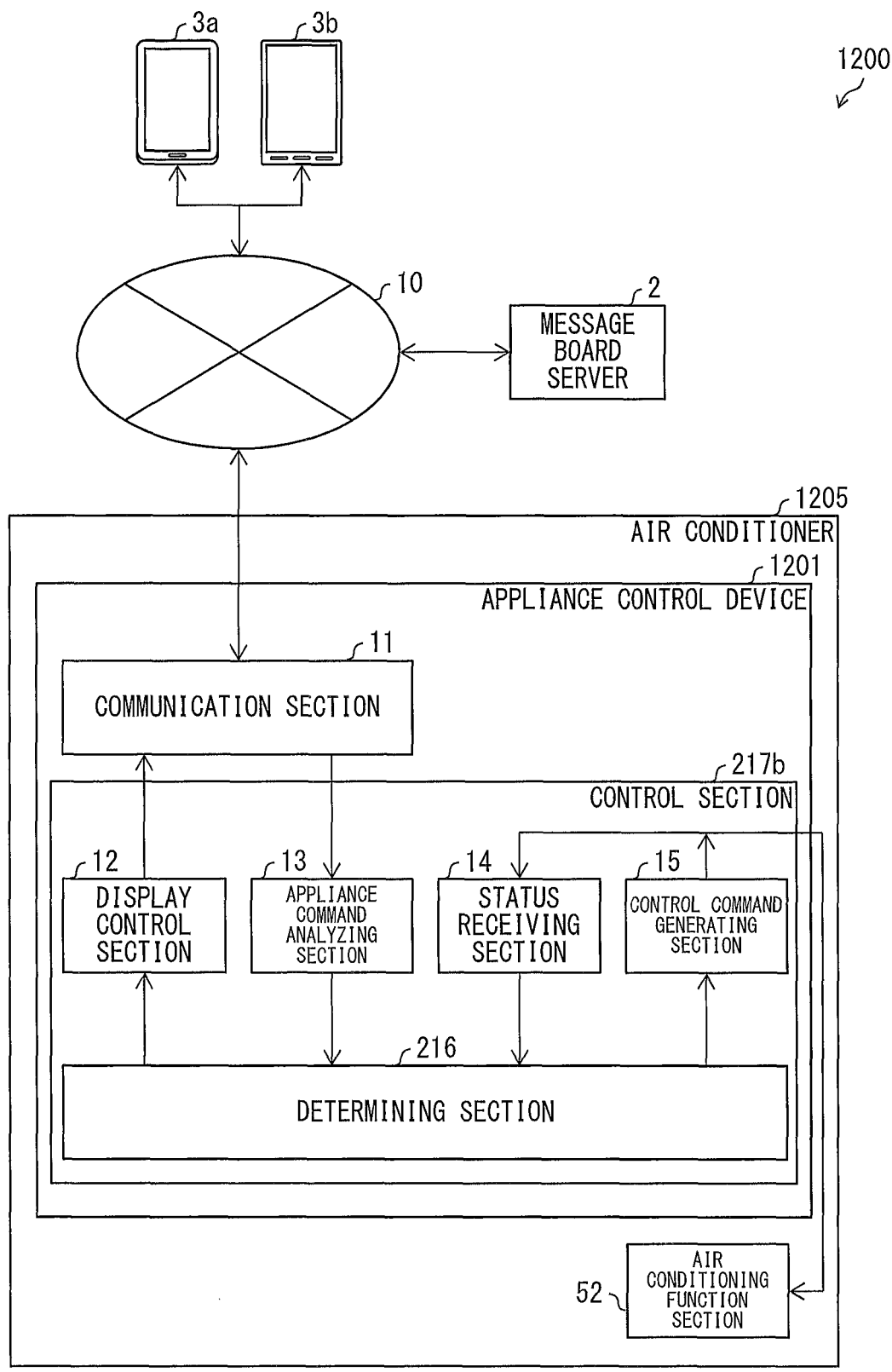
FIG. 9 is a block diagram illustrating a configuration of main parts of an appliance control device in accordance with an embodiment of the present invention.
Figure 10:
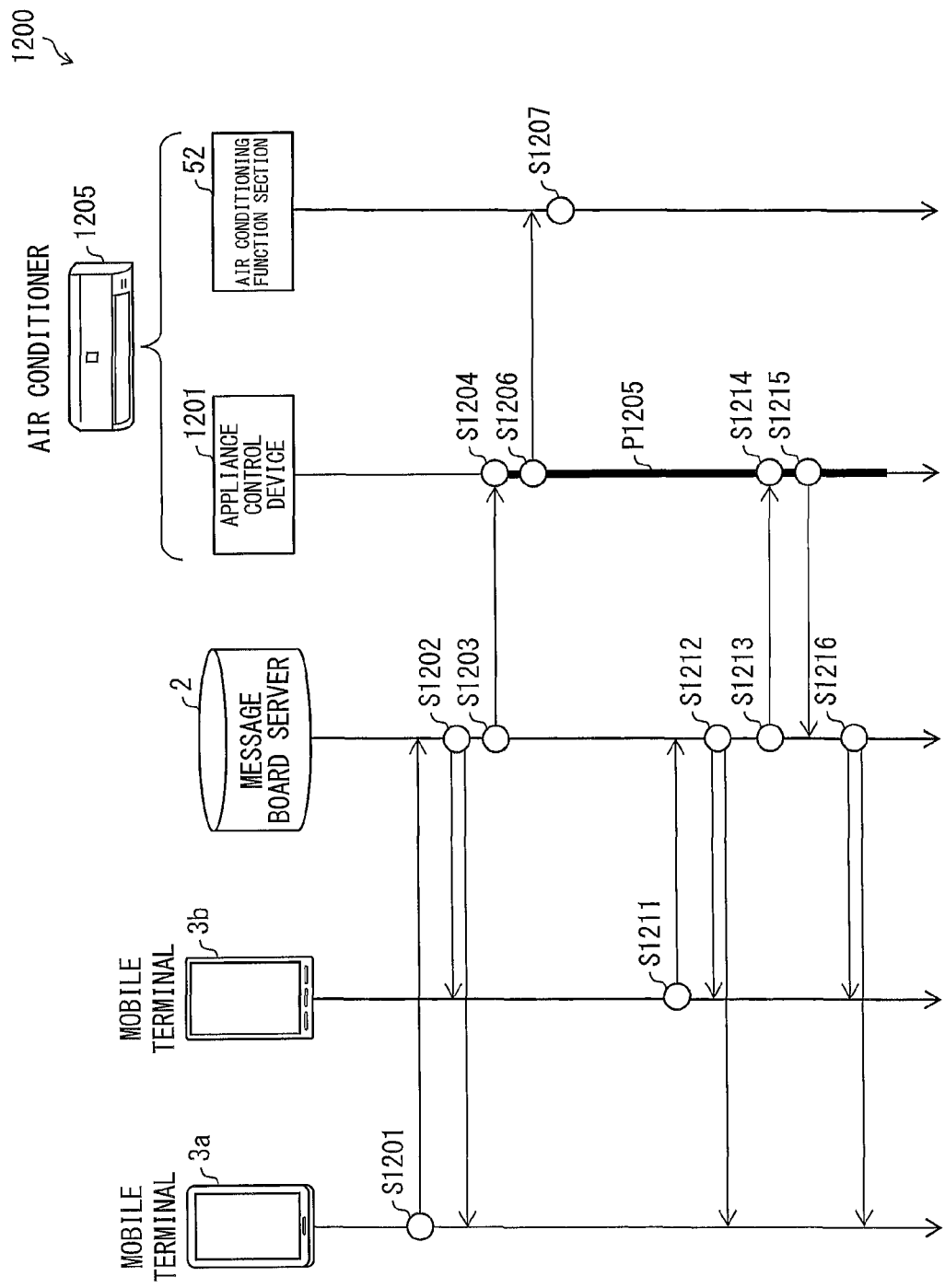
FIG. 10 is a sequence diagram showing the flow of the procedure of appliance control performed in an appliance control system in accordance with an embodiment of the present invention.

The following will describe an appliance control system 1200, which is a modification example of the appliance control system 20Q, with reference to FIGS. 9 and 10. FIG. 9 is a block diagram illustrating a configuration of main parts of the appliance control system 1200 illustrated in (b) of FIG. 6. FIG. 10 is a sequence diagram showing the flow of the procedure of appliance control performed in the appliance control system 1200.

(Appliance Control System 1200)

The appliance control system 1200 includes a message board server 2, a mobile terminal 3, and an air conditioner 1205. As is the case with the air conditioner 205 illustrated in FIG. 16, the air conditioner 1205 includes a communication section 11, a control section 217b, a storage section 218, and an air conditioning function section 52. The control section 217b executes various kinds of programs which are stored in the storage section 218 to implement respective functions of a display control section 12, an appliance command analyzing section 13, a status receiving section 14, and a control command generating section 15, which are illustrated in FIG. 9. Also, it can be said that the air conditioner 1205 includes an appliance control device 1201 (notification device) and the air conditioning function section 52.

As in the case with the appliance control server 1 in accordance with Embodiment 1, the appliance control device 1201 includes a communication section 11, a display control section 12, an appliance command analyzing section 13, a status receiving section 14, and a control command generating section 15.

Upon receipt of the determination result indicating that the operation indicated by the operation signal is ready to be executed from the determining section 16, the control command generating section 15 generates a control command (control signal) for causing the air conditioner 1205 to execute the operation indicated by the operation signal and then transmits the control command thus generated to the air conditioning function section 52. Optionally, the status receiving section 14 may be configured to receive, from the air conditioning function section 52, a status signal indicative of whether or not the air conditioning function section 52 is ready to accept the operation.

Note that the display control section 12 provided in the appliance control system 1200 is preferably configured to generate minimum data required to display on the message board and then transmit the data thus generated to the message board server 2. The minimum data required to display on the message board may be a code represented by a character string like "E500", for example. In this arrangement, the message board server 2 preferably stores therein objects which are respectively associated with codes. The message board server 2 selects an object which is associated with a code received from the display control section 12, and then causes the message board to display the object thereon.

According to the above arrangement, the display control section 12 provided in the appliance control system 1200 may generate a code represented by a character string rather than an object in a format displayable on the message board. Thus, the display control section 12 configured to generate a code can be realized with a simpler structure than the display control section configured to generate the object.

The following will describe a series of steps of appliance control performed in the appliance control system 1200 with reference to FIG. 10. FIG. 10 is a sequence diagram showing the flow of the procedure of appliance control performed in the appliance control system 1200.

The mobile terminal 3*a* transmits, to the message board server 2, a temperature increase signal corresponding to an operation for causing the air conditioner 1205 to increase the setting temperature (step S1201).

The message board server 2 causes the message board to display thereon a message indicating that the message board server 2 has received the temperature increase signal from the mobile terminal 3*a* (step S1202).

The message board server 2 transmits the temperature increase signal to the appliance control device 1201, and the communication section 11 of the appliance control device 1201 provided in the air conditioner 1205 then receives the temperature increase signal (step S1203, step (a)).

The determining section 16 of the appliance control device 1201 determines whether or not the operation for causing the air conditioning function section 52 to increase the setting temperature should be denied (step S1204, step (b)). Given that this timing falls outside the exclusive time period of the air conditioning function section 52, the determining section 16 determines that the operation for causing the air conditioning function section to increase the setting temperature should not be denied (i.e. should be permitted). At this time, the determining section 16 sets an exclusive time period P1205 as a predetermined time period required to complete the operation for causing the air conditioning function section 52 to increase the setting temperature.

In response to a result of the determination made by the determining section 16 to permit the operation, the control command generating section 15 generates a temperature increase command for causing the air conditioning function section 52 to increase the setting temperature and then transmits the temperature increase command thus generated to the air conditioning function section 52 (step S1206).

The air conditioning function section 52 accepts the temperature increase command and then increases the setting temperature (step S1207).

The mobile terminal 3*b* transmits, to the message board server 2, a temperature decrease signal corresponding to an operation for causing the air conditioner 1205 to decrease the setting temperature (step S1211).

The message board server 2 causes the message board to display thereon a message indicating that the message board server 2 has received the temperature decrease signal from the mobile terminal 3*b* (step S1212).

The message board server 2 transmits the temperature decrease signal to the appliance control device 1201, and the communication section 11 of the appliance control device 1201 then receives the temperature decrease signal (step S1213, step (a)).

The determining section 16 of the appliance control device 1201 determines whether or not the operation for causing the air conditioning function section 52 to decrease the setting temperature should be denied (step S1214, step (b)). Given that this timing falls within the exclusive time period P1205 of the air conditioning function section 52, the determining section 16 determines that the operation for causing the air conditioning function section 52 to decrease the setting temperature should be denied.

In response to a result of the determination made by the determining section 16, the display control section 12 transmits, to the message board server 2, a signal indicating that the operation for causing the air conditioning function section 52 to decrease the setting temperature is to be denied (step S1215).

The message board server 2 causes the message board to display thereon an object indicating that the operation for causing the air conditioning function section to decrease the setting temperature has not been accepted (step S1216, step (c)).

Note that in response to the event of the message board server 2 displaying the object (step S1216), a notification that display update of the message board is done may be displayed on the mobile terminal. The notification may contain whole or part of the object displayed on the message board. In an arrangement in which the notification contains the object, the mobile terminal displays or plays back the object. In an arrangement in which the object contains a link, the mobile terminal may be configured to automatically download data from a link destination and play back the data. The notification that display update of the message board is done may be obtained by polling made by the mobile terminal or by push transmission from the message board server 2. In particular, it is an effective that the notification is displayed on the mobile terminal 3*b*, which is a source of the temperature decrease signal whose corresponding operation has been denied.

Embodiment 3

Figure 11:
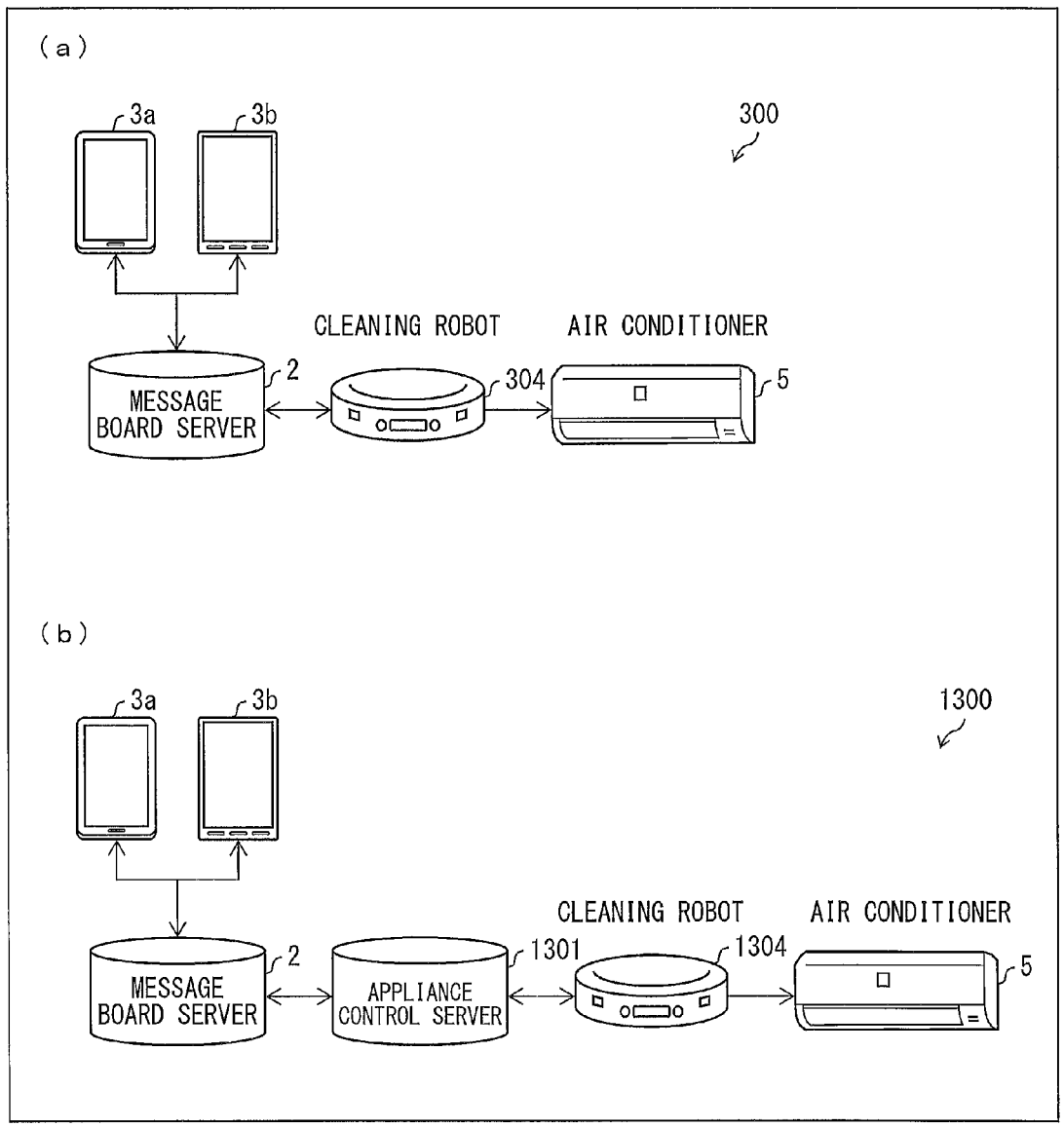
FIG. 11 is a diagram illustrating an overview of a configuration of main parts of an appliance control system in accordance with an embodiment of the present invention.
Figure 12:
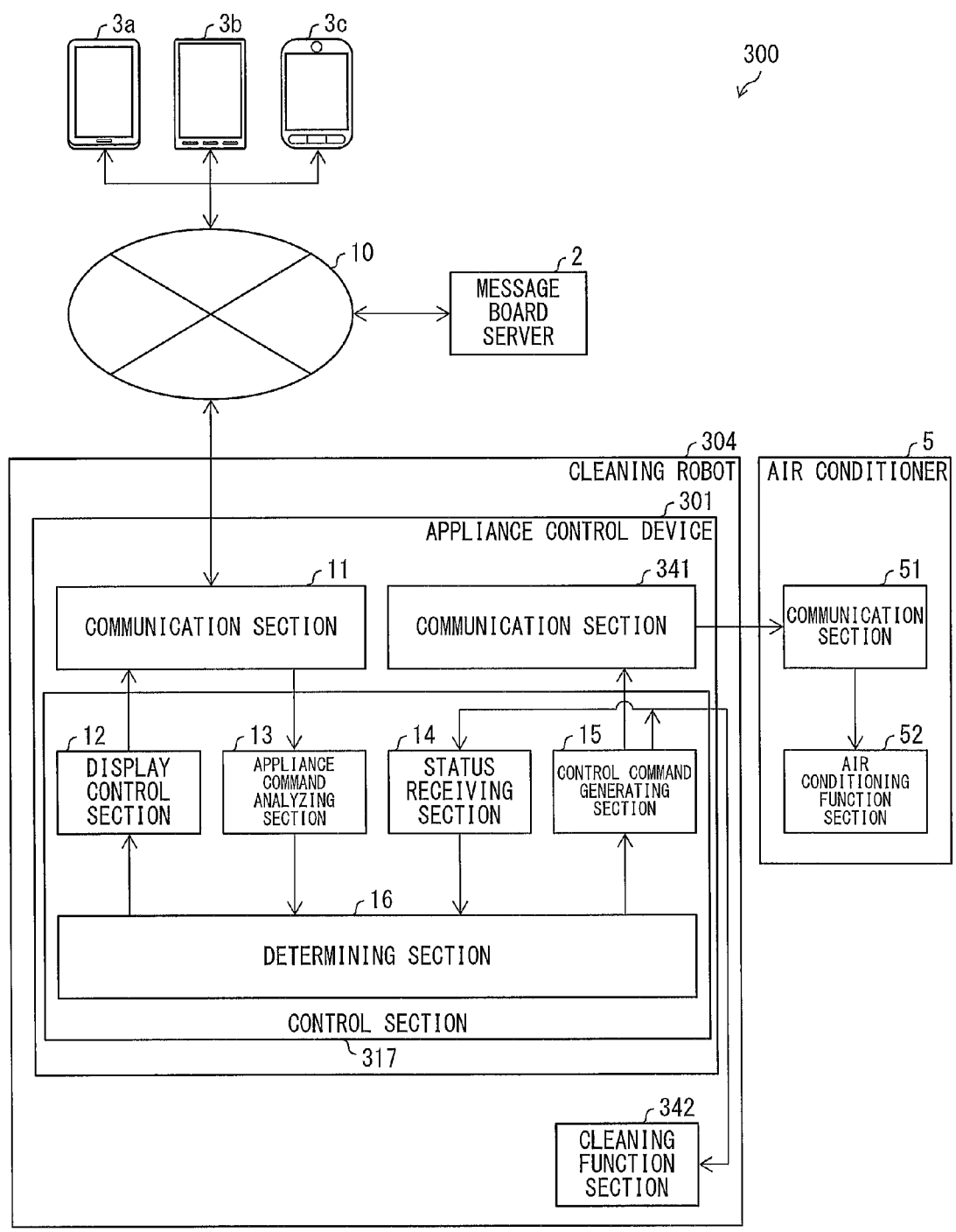
FIG. 12 is a block diagram illustrating a configuration of main parts of an appliance control device in accordance with an embodiment of the present invention.
Figure 13:
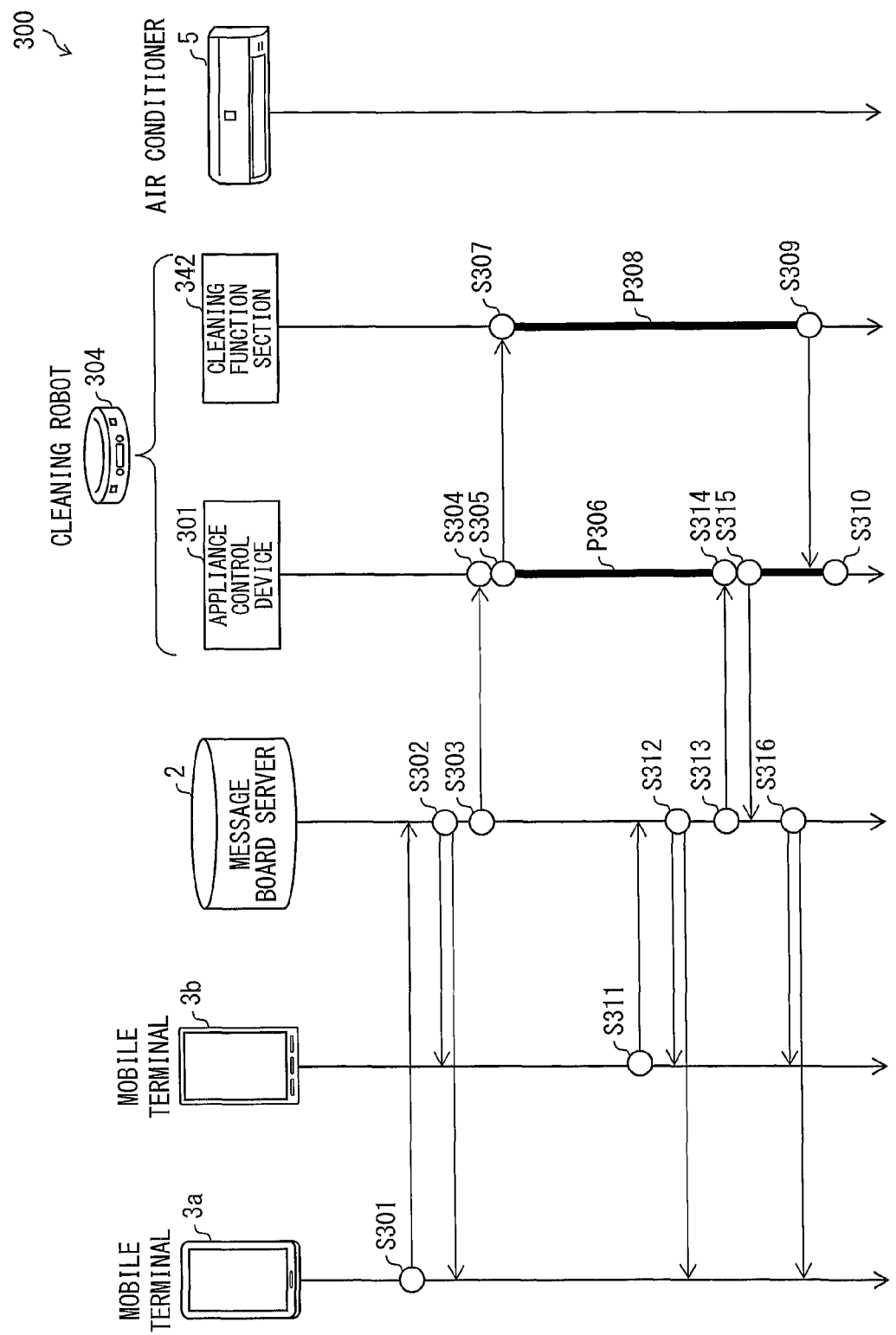
FIG. 13 is a sequence diagram showing the flow of the procedure of appliance control performed in an appliance control system in accordance with an embodiment of the present invention.

The following will describe an appliance control system (notification system) in accordance with Embodiment 3 with reference to FIGS. 11 to 13 and FIG. 17. For convenience of explanation, members of Embodiment 3 that are identical in function to their respective corresponding members described in Embodiments 1 and 2 are each assigned a common reference numeral, and are not described here. FIG. 11 is a diagram illustrating an overview of a configuration of main parts of the appliance control system in accordance with Embodiment 3. FIG. 12 is a block diagram illustrating a configuration of main parts of a cleaning robot 304 illustrated in (a) of FIG. 11. FIG. 13 is a sequence diagram showing the flow of the procedure of appliance control performed in an appliance control system 300.

In the appliance control system 300 illustrated in (a) of FIG. 11, the individual blocks (the communication section 11, the display control section 12, the control command generating section 15, and the determining section 16) for implementing the notification device are provided in the cleaning robot 304. The cleaning robot 304 includes a communication section 341 being capable of transmitting a control command to an air conditioner 5. Detailed descriptions will be provided with reference to FIG. 12. According to the above arrangement, the cleaning robot 304 can transmit, to the air conditioner 5, a control command for executing an operation indicated by an operation signal, received via the message board server, for operating the air conditioner 5. That is, the cleaning robot 304 functions as a signal relay unit in the appliance control system 300. An appliance control device 301 provided in the cleaning robot 304 is capable of supplying a control command to a cleaning function section 342 of the cleaning robot 304. That is, the cleaning robot 304 serves as an appliance to be controlled and a signal relay unit.

In an appliance control system 1300 illustrated in (b) of FIG. 11, individual blocks for implementing the notification device are provided separately in an appliance control server 1301 and a cleaning robot 1304. The cleaning robot 1304, as is the case with the cleaning robot 304, includes a communication section 341 being capable of transmitting a control command to the air conditioner 5. That is, the cleaning robot 1304 serves as an appliance to be controlled and a signal relay unit.

(Appliance Control System 300)

The appliance control system 300 includes a message board server 2, a mobile terminal 3, a cleaning robot 304, and an air conditioner 5. As illustrated in FIG. 17, the cleaning robot 304 includes a communication section 11, a communication section 341, a cleaning function section 342, a control section 317, and a storage section 318. FIG. 17 is a block diagram illustrating a hardware configuration of the cleaning robot 304. The control section 317 executes various kinds of programs which are stored in the storage section 318 to implement respective functions of a display control section 12, an appliance command analyzing section 13, a status receiving section 14, a control command generating section 15, and a determining section 16, which are illustrated in FIG. 12. Also, it can be said that the cleaning robot 304 includes the appliance control device 301 and the cleaning function section 342.

As in the case with the appliance control server 1 in accordance with Embodiment 1, the appliance control device 301, which is a notification device, includes a communication section 11, a display control section 12, an appliance command analyzing section 13, a status receiving section 14, a control command generating section 15, and a determining section 16.

Upon receipt of the determination result indicating that the operation indicated by the operation signal is ready to be executed from the determining section 16, the control command generating section 15 generates a control command (control signal) for causing the cleaning function section 342 to execute the operation and then transmits the control command thus generated to the cleaning function section 342. Optionally, the status receiving section 14 may be configured to receive, from the cleaning function section 342, a status signal indicative of whether or not the cleaning function section 342 is ready to accept the operation. In these points, the appliance control device 301 is similar to the appliance control device 1201 described in Embodiment 2.

The appliance control device 301 includes, not only the above components, but also the communication section 341 for transmitting the control command to the air conditioner 5. The communication section 341, which needs only to be communicable with a communication section 51 provided in the air conditioner 5, may be, for example, an infrared transmitting section being capable of transmitting an infrared ray. In this arrangement, the communication section 51 of the air conditioner 5 is an infrared receiving section being capable of receiving an infrared ray. In a case where the communication section 341 is the an infrared transmitting section, the appliance control device 301, as is the case with a remote controller (not illustrated) with which the air conditioner 5 is provided, can transmit a control command to the air conditioner 5.

Note that the electrical appliance serving as the signal relay unit is not limited to the cleaning robot 304, but is preferably configured to be movable. Such a movable signal relay unit can transmit control commands to appliances to be controlled, which appliances are placed in various locations.

Further, the communication section 51 of the air conditioner 5 may be configured to be capable of transmitting an infrared ray, and the communication section 341 of the appliance control device 301 may be configured to be capable of receiving an infrared ray. According to this arrangement, the air conditioning function section 52 can transmit, to the appliance control device 301, a status signal indicative of whether or not the air conditioning function section 52 is ready to accept the operation. In this case, the communication section 341 can feed, to the status receiving section 14, the status signal received from the communication section 51.

In the present embodiment, an infrared communication is taken as an example of a method of communication between the communication sections 341 and 51. The method of communication is not limited to infrared communication, but is preferably a method that enables wireless communication. A wired communication method, which requires wiring connections, is not preferable because the cleaning robot 304 moves in a house. Note, however, that the method of communications may be a communication method enabling wired communication, if the signal relay unit is not a movable electrical appliance like the cleaning robot 304, but is a stationary electrical appliance like television set 6, for example.

(In the Event that the Signal Relay Unit is Busy)

The cleaning robot 304 serves as the signal relay unit and the appliance to be controlled. Hence, an event can occur that the appliance control device 301 newly receives an operation signal for instructing a new operation during a period in which the cleaning function section 342 is running to execute a certain operation. In a case where the appliance to be controlled for the new operation signal is the cleaning robot 304, the determining section 16 determines that the operation indicated by the newly received operation signal should be denied. This is because the cleaning robot 304, which is the appliance to be controlled, executes other operation, and the timing of reception of the newly received operation signal falls within the exclusive time period of the cleaning robot 304.

On the other hand, in a case where the appliance to be controlled for the newly received operation signal is the air conditioner 5, whether or not the determining section 16 determines that the operation indicated by the newly received operation signal should be denied depends on what kind of operation is being executed by the cleaning function section 342. For example, assume that the operation being executed by the cleaning function section 342 is cleaning. During the cleaning, it is difficult for the cleaning robot 304 to relay a control command based on the operation signal and transmit the control command to the air conditioner 5. This is because during the period in which the cleaning robot 304 is executing the cleaning, the cleaning robot 304 moves to various locations and does not always exist at a position that enables infrared communication with the communication section 51 of the air conditioner 5.

Consequently, during a period in which the cleaning robot 304 is executing an operation that requires the cleaning robot 304 to move, the determining section 16 preferably denies the operation indicated by the newly received operation signal. In this case, the display control section 12 may cause the message board to display thereon an object containing a character string saying "It is busy now. So, any other operations cannot be accepted. Cleaning will be finished in 13 minutes. Please retry later."

In other words, the display control section 12 preferably causes the message board to display thereon an object containing (1) information indicating that the operation cannot be accepted, (2) information indicating a reason why the operation cannot be accepted, (3) information indicating a time period taken until another operation gets ready to be accepted, and (4) information prompting a retry of an instruction to execute the operation. The object contains at least the information (1) although the content of the object to be displayed on the message board by the display control section 12 can be selected appropriately.

The following will describe a series of steps of appliance control performed in the appliance control system 300 with reference to FIG. 13. FIG. 13 is a sequence diagram showing the flow of the procedure of appliance control performed in the appliance control system 300. The following description deals with appliance control performed when the cleaning robot 304 has received a control command based on a newly received operation signal in the middle of executing cleaning.

The mobile terminal 3a transmits, to the message board server 2, an operation signal (cleaning execution signal) indicating a cleaning operation (step S301).

The message board server 2 causes the message board to display thereon a message indicating that the message board server 2 has received the cleaning execution signal from the mobile terminal 3a (step S302).

The message board server 2 transmits the cleaning execution signal to the cleaning robot 304, and the communication section 11 of the appliance control device 301 provided in the cleaning robot 304 then receives the cleaning execution signal (step S303, step (a)).

The determining section 16 of the appliance control device 301 determines whether or not the cleaning operation is ready to be executed by the cleaning function section 342 of the cleaning robot 304 (step S304, step (b)). At this time, the determining section 16 sets an exclusive time period P306 as a predetermined time period required for the cleaning function section 342 to complete the cleaning.

In a case where the cleaning operation is ready to be executed, the control command generating section 15 of the appliance control device 301 feeds a cleaning initiation command to the cleaning function section 342 (step S305).

The cleaning function section 342 accepts the cleaning initiation command and then initiates cleaning. In accordance with a cleaning pattern, which is indicated by the cleaning initiation command, the cleaning function section 342 executes cleaning for a cleaning period P308, which is a predetermined time period (step S307).

Upon completion of cleaning, the cleaning function section 342 transmits a cleaning completion notification to the status receiving section 14 of the appliance control device 301 (step S309).

Upon receipt of the cleaning completion notification from the cleaning function section 342, the determining section 16 of the appliance control device 301 terminates the set exclusive time period P306 (step S310).

The mobile terminal 3b transmits, to the message board server 2, a temperature decrease command for causing the air conditioner 5 to decrease the setting temperature (step S311).

The message board server 2 causes the message board to display thereon a message indicating that the message board server 2 has received the temperature decrease command from the mobile terminal 3b (step S312).

The message board server 2 transmits the temperature decrease command to the cleaning robot 304, and the communication section 11 of the appliance control device 301 provided in the cleaning robot 304 then receives the temperature decrease command (step S313, step (a)).

The determining section 16 of the appliance control device 301 determines whether or not the temperature decrease command is ready to be executed (step S314, step (b)). Given that this timing falls within the exclusive time period P306, the determining section 16 determines that the temperature decrease command is not ready to be executed, and then notifies to the message board server 2 that the temperature decrease command cannot be accepted (step S315).

The message board server 2 causes the message board to display thereon a message indicating that the temperature decrease command has not been accepted (step S316, step (c)).

Note that in response to the event of the message board server 2 displaying the object (step S316), a notification that display update of the message board is done may be displayed on the mobile terminal. The notification may contain whole or part of the object displayed on the message board. In an arrangement in which the notification contains the object, the mobile terminal displays or plays back the object. In an arrangement in which the object contains a link, the mobile terminal may be configured to automatically download data from a link destination and play back the data. The notification that display update of the message board is done may be obtained by polling made by the mobile terminal or by push transmission from the message board server 2. In particular, it is an effective that the notification is displayed on the mobile terminal 3b, which is a source of the temperature decrease signal whose corresponding operation has been denied.

Modification Example 2

As described earlier, the appliance control system 1300, which is a modification example of the appliance control system 300, includes the individual blocks for implementing a notification device, wherein the blocks are provided separately in the appliance control server 1301 and the cleaning robot 1304. For example, as is the case with the appliance control system 200 described in Embodiment 2, the notification device can be configured (i) by providing the display control section in the appliance control server 1301 and (ii) by providing the communication section, the control command generating section, and the determining section in the cleaning robot 1304.

The cleaning robot 1304, as is the case with the cleaning robot 304, includes the communication section 341 being capable of transmitting a control command to the air conditioner 5. That is, the cleaning robot 1304 serves as an appliance to be controlled and a signal relay unit.

Embodiment 4

Figure 14:
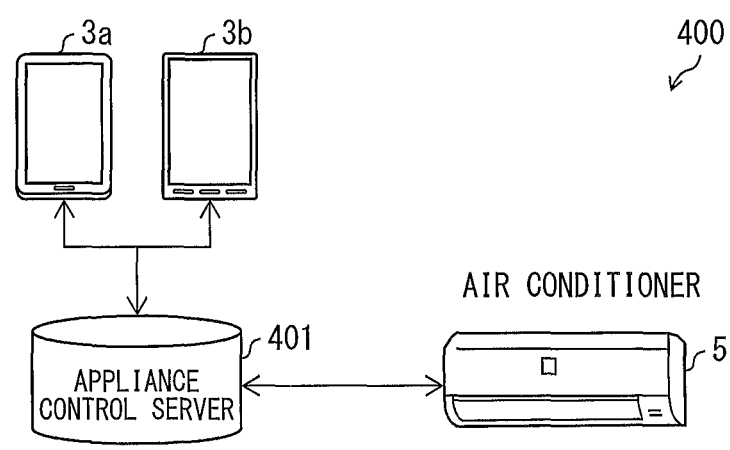
FIG. 14 is a diagram illustrating an overview of a configuration of main parts of the appliance control system in accordance with an embodiment of the present invention.

The following will describe an appliance control system (notification system) in accordance with Embodiment 4 with reference to FIG. 14. For convenience of explanation, members of Embodiment 4 that are identical in function to their respective corresponding members described in Embodiments 1 to 3 are each assigned a common reference numeral, and are not described here. FIG. 14 is a diagram illustrating an overview of a configuration of main parts of the appliance control system in accordance with Embodiment 4.

In an appliance control system 400 illustrated in FIG. 14, the individual blocks (the communication section 11, the display control section 12, the control command generating section 15, and the determining section 16) for implementing the notification device are provided in an appliance control server 401. The appliance control server 401 further includes the message board server 2 of the appliance control system 100 illustrated in FIG. 1. That is, the appliance control server 401 includes both of the configurations of the appliance control server 1 and message board server 2, which are provided in the appliance control system 100.

According to the above arrangement, the determining section 16 provided in the appliance control server 401 determines whether or not the operation indicated by the operation signal received from the mobile terminal 3 should be denied. In a case where the determining section 16 determines that the operation should be denied, the display control section 12 provided in the appliance control server 401 causes the message board to display thereon an object indicating that the operation has been denied, based on a result of the determination made by the determining section 16. In other words, upon receipt of the instruction from the display control section 12, the message board server provided in the appliance control server 401 causes the message board to display thereon the object indicating that the operation has been denied. Note that in a case where the determining section 16 determines that the 12 may cause the message board to display thereon an object indicating that the operation has not been denied.

According to the above arrangement, the appliance control server 401 serves not only as an appliance control server but also as a message board server. The appliance control server 401 can, therefore, cause the message board to promptly display thereon an object indicating a result of the determination made by the determining section 16. That is, the appliance control server 401 can promptly notify the user of the result of the determination made by the determining section 16. The above arrangement allows for an appliance control system with simplified configuration.

Embodiment 5

Control blocks (particularly, the communication section 11, the display control section 12, and the determining section 16) provided in both the appliance control servers (notification devices) and the appliance control devices (notification devices), which are described in the foregoing embodiments, may be realized by a logic circuit (hardware) provided in an integrated circuit (IC chip) or the like or may be realized by software as executed by a CPU (Central Processing Unit).

In the latter case, the appliance control server and the appliance control device, both of which are described in the foregoing embodiments, each include: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

[Outline]

A notification method in accordance with Aspect 1 of the present invention is a notification method for providing notification of an operating status of an electrical appliance, including the steps of: (a) receiving an operation signal for operating the electrical appliance; (b) determining whether or not to deny an operation indicated by the operation signal received in the step (a); and (c) when the step (b) determines to deny the operation, causing an electronic message board to display thereon an object indicating that the operation is denied.

According to the above arrangement, the step (b) determines whether or not to deny the operation indicated by the operation signal for operating the electrical appliance. Further, when the step (b) determines to deny the operation, the step (c) causes the electronic message board to display thereon the object indicating that the operation is denied. The above arrangement therefore makes it possible to, when an operation instructed with respect to the electrical appliance is denied, notify to a plurality of users that the operation is denied.

A notification method in accordance with Aspect 2 of the present invention may be arranged such that the determination in the step (b) is made in accordance with a determination criterion associated with an operation indicated by a previously received operation signal which precedes the operation signal.

According to the above arrangement, the determination in the step (b) is made in accordance with the determination criterion associated with the operation indicated by the previously received operation signal. The above arrangement therefore makes it possible to provide more accurate determination as to whether or not to deny the operation indicated by the operation signal received in the step (a).

A notification method in accordance with Aspect 3 of the present invention may be arranged such that the step (b) determines, after the previously received operation signal is received, to deny an operation indicated by an operation signal which is received before lapse of an exclusive time period, the exclusive time period being associated with the operation indicated by the previously received operation signal.

According to the above arrangement, after the previously received operation signal is received, an operation indicated by an operation signal which is received before lapse of an exclusive time period is denied, wherein the exclusive time period is associated with the operation indicated by the previously received operation signal. The above arrangement therefore makes it possible to prevent malfunction or the like of an electrical appliance due to successive operations executed within a short period of time.

A notification method in accordance with Aspect 4 of the present invention may be arranged such that the step (b) determines, after the previously received operation signal is received, to deny an operation (i) indicated by an operation signal which is received before lapse of a time period and (ii) being identical in attribute to the previously received operation signal, the time period being associated with the operation indicated by the previously received operation signal.

According to the above arrangement, an operation (i) indicated by an operation signal which is received before lapse of a time period associated with the operation indicated by the previously received operation signal and (ii) being identical in attribute to the previously received operation signal is denied. The above arrangement therefore makes it possible to prevent the occurrence of unsatisfactory result for the users caused by execution of successive operations identical in attribute within a short period of time.

A notification method in accordance with Aspect 5 of the present invention is preferably arranged, in any one of Aspects 1 through 4, to further include the step of: (d) causing the electronic message board to display thereon an object indicating that the operation signal is received in the step (a).

According to the above arrangement, the notification method further includes the step of causing the electronic message board to display thereon the object indicating that the operation signal is received in the step (a). With this arrangement, the notification method makes it possible to notify to the users that the operation signal has been received, regardless of whether or not to deny the operation indicated by the received operation signal. In other words, the users can know what kind of operation signal has been transmitted with respect to the electrical appliance. Consequently, a user who is in an attempt to instruct his/her mobile terminal transmit a new operation signal can accurately determine whether or not to instruct the mobile terminal to transmit that operation signal.

A notification method in accordance with Aspect 6 of the present invention is preferably arranged, in any one of Aspects 1 through 5, to further include the step of: (e) when the step (b) determines not to deny the operation, causing the electronic message board to display thereon an object indicating that the operation indicated by the operation signal is executed by the electrical appliance.

According to the above arrangement, when the step (b) determines not to deny the operation, the object indicating that the operation indicated by the operation signal is executed by the electrical appliance is displayed on the electronic message board. This allows the users to know what kind of operation is executed by the electrical appliance. Consequently, a user who is in an attempt to instruct his/her mobile terminal to transmit a new operation signal can accurately determine whether or not to instruct the mobile terminal to transmit that operation signal.

A notification device in accordance with Aspect 7 of the present invention is a notification device for providing notification of an operating status of an electrical appliance, including: a receiving section for receiving an operation signal for operating the electrical appliance; determining means for determining whether or not to deny an operation indicated by the operation signal received by the receiving section; and display control means for, when the determining means determines to deny the operation, causing an electronic message board to display thereon an object indicating that the operation is denied.

A notification system in accordance with Aspect 8 of the present invention is a notification system including: a notification device for providing notification of an operating status of an electrical appliance; and the electrical appliance, the notification device including: a receiving section for receiving an operation signal for operating the electrical appliance; determining means for determining whether or not to deny an operation indicated by the operation signal received by the receiving section; display control means for, when the determining means determines to deny the operation, causing an electronic message board to display thereon an object indicating that the operation is denied; and control signal generating means for, when the determining means determines not to deny the operation, generating a control signal for controlling the electrical appliance to execute the operation, the electrical appliance including: a control signal receiving section for receiving the control signal generated by the control signal generating means; and operation executing means for executing the operation based on the control signal.

An electronic message board server in accordance with Aspect 9 of the present invention is an electronic message board server for providing notification of an operating status of an electrical appliance in cooperation with a notification device for providing notification of the operating status of the electrical appliance, the electronic message board server including: a message board control signal receiving section for receiving a message board control signal from the notification device; and message board managing means for causing an electronic message board to display thereon an object corresponding to the message board control signal, when the message board control signal receiving section receives the message board control signal which indicates an instruction to display an object indicating that the notification device has denied an operation indicated by an operation signal, received by the notification device, for operating the electrical appliance, the message board managing means causing the electronic message board to display thereon the object indicating that the operation has been denied.

A mobile terminal in accordance with Aspect 10 of the present invention is a mobile terminal for providing notification of an operating status of an electrical appliance in cooperation with an electronic message board server and a notification device for providing notification of the operating status of the electrical appliance, the mobile terminal including: a display section for displaying thereon an electronic message board provided by the electronic message board server, when the notification device denies an operation indicated by an operation signal, received by the notification device, for operating the electrical appliance, the display section displaying thereon the electronic message board on which an object indicating that the operation is denied is displayed thereon.

The above arrangements yield an effect similar to the effect yielded by the notification method in accordance with Aspect 1 as above.

Note that each of the notification devices in accordance with the aspects of the present invention may be realized by a computer. In this case, the present invention also encompasses: a program for allowing a computer to serve as the notification device by causing the computer to operate as the foregoing means provided in the notification device; and a non-transitory computer-readable storage medium storing the program therein.

The present invention is not limited to the descriptions of the Embodiments, but can be altered by a person skilled in the art within the scope of the claims. An embodiment derived from a proper combination of technical means disclosed in different embodiments is also encompassed in the technical scope of the present invention. Moreover, a novel technical feature can be created by a combination of technical means disclosed in these embodiments.

INDUSTRIAL APPLICABILITY

The present invention is applicable to a notification method, a notification device, a notification system, a storage medium, an electronic message board server, and a mobile terminal, all of which implement providing notification of an operating status of an electrical appliance.

REFERENCE SIGNS LIST

1 Appliance control server (notification device)
11 Communication section (receiving section)
12 Display control section (display control means)
16 Determining section (determining means)
2 Message board server (electronic message board server)
21 Communication section (message board control signal receiving section)
22 Message board managing section (message board managing means)
3 Mobile terminal
5 Air conditioner (household electrical appliance)
10 Network
100 Appliance control system (notification system)

The invention claimed is:

1. A notification method for providing notification of an operating status of an electrical appliance, comprising:
   (a) receiving an operation signal for operating the electrical appliance, the operation signal being an instruction from a terminal of a user who is a member of a group;
   (b) determining whether or not to deny an operation indicated by the operation signal received in step (a); and
   (c) in a case where step (b) determines to deny the operation, causing an information exchange networking service offered to allow information exchanges among members of the group to display thereon an object indicating that the operation is denied.

2. The notification method according to claim 1, wherein the determination in step (b) is made in accordance with a determination criterion associated with an operation indicated by a previously received operation signal which precedes the operation signal.

3. The notification method according to claim 2, wherein step (b) determines, after the previously received operation signal is received, to deny an operation indicated by an operation signal which is received before lapse of an exclusive time period, the exclusive time period being associated with the operation indicated by the previously received operation signal.

4. The notification method according to claim 2, wherein step (b) determines, after the previously received operation signal is received, to deny an operation (i) indicated by an operation signal which is received before lapse of a time period and (ii) being identical in attribute to the previously received operation signal, the time period being associated with the operation indicated by the previously received operation signal.

5. The notification method according to claim 2, wherein in step (c) an object including information indicating the previously received operation signal is displayed on the information exchange networking service.

6. The notification method according to claim 2, further comprising an object including information indicating the previously-received operation signal includes information indicating a member who has instructed the electrical appliance to make an operation indicated by the previously received operation signal.

7. The notification method according to claim 2, further comprising an object including information indicating the previously-received operation signal includes information indicating a content of an operation indicated by the previously received operation signal.

8. The notification method according to claim 1, further comprising:
   (d) causing the information exchange networking service to display thereon an object indicating that the operation signal is received in step (a).

9. The notification method according to claim 1, further comprising:
   (e) in a case where step (b) determines not to deny the operation, causing the information exchange networking service to display thereon an object indicating that the operation indicated by the operation signal is executed by the electrical appliance.

10. The notification method according to claim 1 wherein the object includes information indicating a member who has instructed the electrical appliance to make the denied operation.

11. The notification method according to claim 1, wherein the object includes information indicating a content of the denied operation.

12. The notification method according to claim 1, wherein the instruction is provided to the electrical appliance through the information exchange networking service.

13. A notification device for providing notification of an operating status of an electrical appliance, comprising:
   a receiver for receiving an operation signal for operating the electrical appliance, the operation signal being an instruction from a terminal of a user who is a member of a group; and
   one or more processors,
   the one or more processors determining whether or not deny an operation indicated by the operation signal received by the receiver;
   in a case where the one or more processors determine to deny the operation, the one ter more processors causing an information exchange networking service offered to allow information exchanges among members of the group to display thereon an object indicating that the operation is denied.

14. A notification system comprising:
   a notification device for providing notification of an operating status of an electrical appliance; and
   the electrical appliance,
   the notification device comprising:
      a receiver for receiving an operation signal for operating the electrical appliance, the operation signal being an instruction from a terminal of a user who is a member of a group; and one or more processors,
the one or more processors determining whether or not to deny an operation indicated by the operation signal received by the receiver,
in a case where the one or more processors determine to deny the operation, the one or more processors causing an information exchange networking service offered to allow information exchanges among members of the group to display thereon an object indicating that the operation is denied, and
in a case where the one or more processors determine not to deny the operation, the one or more processors generating a control signal for controlling the electrical appliance to execute the operation,
the electrical appliance comprising:
a control signal receiver for receiving the control signal generated by the notification device; and
an operation executing section for executing the operation based on the control signal.

15. An information exchange networking service providing server for providing notification of an operating status of an electrical appliance in cooperation with a notification device for providing notification of the operating status of the electrical appliance,
the information exchange networking service providing server comprising:
a control signal receiver for receiving a control signal from the notification device; and
one or more processors,
the one or more processors causing an information exchange networking service offered to allow information exchanges among members of the group to display thereon an object corresponding to the control signal,
in a case where the control signal receiver receives the control signal which indicates an instruction to display an object indicating that the notification device has denied an operation indicated by an operation signal, received by the notification device, for operating the electrical appliance, the operation signal being an instruction from a terminal of a user who is a member of a group, the one or more processors causing the information exchange networking service to display thereon the object indicating that the operation has been denied.

16. A mobile terminal for providing notification of an operating status of an electrical appliance in cooperation with an information exchange networking service providing server and a notification device for providing notification of the operating status of the electrical appliance,
the mobile terminal comprising:
a display for displaying thereon an information exchange networking service offered to allow information exchanges among members of the group provided by the information exchange networking service providing server; and
one or more processors,
the one or more processors transmitting, to the notification device, an operation signal, corresponding to a user's manipulation accepted from a user, for operating the electrical appliance, the operation signal being an instruction from a terminal of a user who is a member of group,
in a case where the notification device receives the operation signal and denies an operation indicated by the operation signal, the display displaying thereon the information exchange networking service on which an object indicating that the operation is denied is displayed thereon.

17. A non-transitory computer-readable storage medium storing therein a program for causing a computer to function as a mobile terminal for providing notification of an operating status of an electrical appliance in cooperation with an information exchange networking service providing server and a notification device for providing notification of the operating status of the electrical appliance, the mobile terminal including: a display for displaying thereon information exchange networking service offered to allow information exchanges among members of the group provided by the information exchange networking service providing server; and one or more processors,
the program causing the one or more processors to carry out (i) a process for transmitting, to the notification device, an operation signal, corresponding to a user's manipulation accepted from a user, for operating the electrical appliance, the operation signal being an instruction from a terminal of a user who is a member of a group and (ii) a process for, in a case where the notification device receives the operation signal and denies an operation indicated by the operation signal, causing the display to display thereon the information exchange networking service on which an object indicating that the operation is denied is displayed thereon.

18. A notification method for providing notification of an operating status of an electrical appliance, comprising:
(a) receiving an operation signal for operating the electrical appliance, the operation signal being an instruction from a terminal of a user who is a member of a group;
(b) determining whether or not to deny an operation indicated by the operation signal received in step (a), made in accordance with a determination criterion associated with an operation indicated by a previously-received operation signal which precedes the operation signal, wherein, after the previously-received operation signal is received, a determination is made to deny an operation indicated by an operation signal which is received before lapse of a time period, the time period being associated with the operation indicated by the previously-received operation signal; and
(c) in a case where step (b) determines to deny the operation, causing an information exchange network service offered to allow information exchanges among members of the group to display thereon an object indicating that the operation is denied.

19. A notification device for providing notification of an operating status of an electrical appliance, comprising:
a receiver for receiving an operation signal for operating the electrical appliance, the operation signal being an instruction from a terminal of a user who is a member of a group; and
one or more processors,
the one or more processors determining whether or not to deny an operation indicated by the operation signal received by the receiver, the determination made in accordance with a determination criterion associated with an operation indicated by a previously-received operation signal which precedes the operation signal, and, after the previously-received operation signal is received, the determination is made to deny an operation indicated by an operation signal which is received before lapse of a time period, the time period being associated with the operation indicated by the previously-received operation signal,
in a case where the one or more processors determine to deny the operation, the one or more processors causing an information exchange networking service offered to allow information exchanges among members of the group to display thereon an object indicating that the operation is denied.

20. A mobile terminal for providing notification of an operating status of an electrical appliance in cooperation with an information exchange networking service providing server and a notification device for providing notification of the operating status of the electrical appliance, the mobile terminal comprising:

a display for displaying thereon the information exchange networking service offered to allow information exchanges among members of the group provided by the information exchange networking service providing server; and one or more processors, the one or more processors transmitting, to the notification device, an operation signal, corresponding to a user's manipulation accepted from a user, for operating the electrical appliance, the operation signal being an instruction from a terminal of a user who is a member of a group, in a case where the notification device receives the operation signal and denies an operation indicated by the operation signal, the display displaying thereon the information exchange networking service on which an object indicating that the operation is denied is displayed thereon, wherein denying the operation indicated by the operation signal is determined in accordance with a determination criterion associated with an operation indicated by a previously received operation signal which precedes the operation signal and, after the previously-received operation signal is received, the determination is made to deny an operation indicated by an operation signal which is received before lapse of a time period, the time period being associated with the operation indicated by the previously-received operation signal.

* * * * *